United States Patent
Horvitz

(10) Patent No.: US 7,797,267 B2
(45) Date of Patent: Sep. 14, 2010

(54) METHODS AND ARCHITECTURE FOR LEARNING AND REASONING IN SUPPORT OF CONTEXT-SENSITIVE REMINDING, INFORMING, AND SERVICE FACILITATION

(75) Inventor: Eric J. Horvitz, Kirkland, WA (US)

(73) Assignee: Microsoft Corporation, Redmond, VA (US)

( * ) Notice: Subject to any disclaimer, the term of this patent is extended or adjusted under 35 U.S.C. 154(b) by 443 days.

(21) Appl. No.: 11/428,225

(22) Filed: Jun. 30, 2006

(65) Prior Publication Data
US 2008/0005055 A1    Jan. 3, 2008

(51) Int. Cl.
*G06N 5/02* (2006.01)
(52) U.S. Cl. ............... 706/46; 706/21; 706/52
(58) Field of Classification Search ............ 706/46, 706/52, 21
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,154,745 A | 11/2000 | Kari et al. | |
| 6,292,687 B1 | 9/2001 | Lowell et al. | |
| 6,317,718 B1 | 11/2001 | Fano | |
| 6,353,398 B1 | 3/2002 | Amin et al. | |
| 6,418,424 B1 | 7/2002 | Hoffberg et al. | |

(Continued)

FOREIGN PATENT DOCUMENTS

KR   2004-0078955 A   9/2004

(Continued)

OTHER PUBLICATIONS

E. Horvitz, A. Jacobs, D. Hovel. Attention-Sensitive Alerting, Proceedings of UAI '99, Conference on Uncertainty and Artificial Intelligence, Jul. 1999, Morgan Kaufmann Publishers: San Francisco. pp. 305-313.*

(Continued)

Primary Examiner—Donald Sparks
Assistant Examiner—Lut Wong
(74) Attorney, Agent, or Firm—Wolf, Greenfield & Sacks, P.C.

(57) ABSTRACT

Methods and architectures for context-sensitive reminding and service facilitating are disclosed. The architectures monitor user context and activity, senses or infers relevant reminders, goals, such as those that come from a growing need of the user that should be fulfilled, and computes best reminders, and recommend plans on fulfilling need(s) in an optimum way. Statistical models of a user's knowledge and recall in different settings may be employed. Facilities, services, and merchants can be identified along a route that the user can take, and cost-benefit analysis is performed for determining which merchant(s) to select to fulfill the need(s). Routes may be created as opportunistic modifications of trips underway. Merchants can respond back with offers of sale to the user for all available needed items, and the user can respond with acceptance or denial of the offers. Merchants can also respond in a bidding fashion in order to gain user's patronage.

23 Claims, 27 Drawing Sheets

U.S. PATENT DOCUMENTS

| | | |
|---|---|---|
| 6,466,232 B1 | 10/2002 | Newell et al. |
| 6,513,046 B1 | 1/2003 | Abbott, III et al. |
| 6,549,915 B2 | 4/2003 | Abbott, III et al. |
| 6,618,593 B1 | 9/2003 | Drutman et al. |
| 6,672,506 B2 | 1/2004 | Swartz et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,889,382 B1 | 5/2005 | Anderson |
| 6,954,735 B1 | 10/2005 | Djupsjobacka et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,071,842 B1 | 7/2006 | Brady, Jr. |
| 7,171,378 B2 | 1/2007 | Petrovich et al. |
| 7,195,157 B2 | 3/2007 | Swartz et al. |
| 7,200,566 B1 | 4/2007 | Moore et al. |
| 7,227,498 B2 | 6/2007 | Soliman |
| 7,245,925 B2 | 7/2007 | Zellner |
| 7,385,501 B2 | 6/2008 | Miller et al. |
| 7,386,477 B2 | 6/2008 | Fano |
| 7,577,522 B2 | 8/2009 | Rosenberg |
| 7,589,628 B1 | 9/2009 | Brady, Jr. |
| 7,596,513 B2 | 9/2009 | Fargo |
| 7,720,715 B1 | 5/2010 | Nemer |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0002504 A1 | 1/2002 | Engel et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2003/0229471 A1 | 12/2003 | Guralnik et al. |
| 2003/0229895 A1 | 12/2003 | Jasinschi et al. |
| 2004/0019603 A1 | 1/2004 | Haigh et al. |
| 2004/0153445 A1 | 8/2004 | Horvitz et al. |
| 2004/0189475 A1 | 9/2004 | Cooper et al. |
| 2004/0201500 A1 | 10/2004 | Miller et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0091118 A1 | 4/2005 | Fano |
| 2005/0097005 A1 | 5/2005 | Fargo |
| 2005/0144318 A1 | 6/2005 | Chang |
| 2005/0219120 A1 | 10/2005 | Chang |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0138219 A1 | 6/2006 | Brzezniak et al. |
| 2008/0004926 A1 | 1/2008 | Horvitz et al. |
| 2008/0090591 A1 | 4/2008 | Miller et al. |
| 2008/0091537 A1 | 4/2008 | Miller et al. |
| 2008/0161018 A1 | 7/2008 | Miller et al. |

FOREIGN PATENT DOCUMENTS

| | | |
|---|---|---|
| KR | 2005-0035336 A | 4/2005 |
| KR | 2005-0045716 A | 5/2005 |
| KR | 2005-0105139 A | 11/2005 |
| WO | 9800787 | 1/1998 |

OTHER PUBLICATIONS

E. Horvitz, P. Koch, R. Sarin, J. Apacible, M. Subramani. Bayesphone: Context-Sensitive Policies for Inquiry and Action in Mobile Devices. Proceedings of the Tenth Conference on User Modeling (UM 2005), Jul. 2005, Edinburgh, Scotland.*

E. Horvitz and M Barry. Display of Information for Time-Critical Decision Making. Proceedings of the Eleventh Conference on Uncertainty in Artificial Intelligence, Aug. 1995.*

E. Horvitz and J. Apacible. Learning and Reasoning about Interruption. Fifth International Conference on Multimodal Interfaces, Nov. 2003.*

E. Horvitz, P. Koch, C.M. Kadie, and A. Jacobs. Coordinate: Probabilistic Forecasting of Presence and Availability.Eighteenth Conference on Uncertainty and Artificial Intelligence, Jul. 2002, pp. 224-233.*

Gregory Biegel, et al. "A Framework for Developing Mobile, Context-aware Applications", 5 pages, accessible at https://www.cs.tcd.ie/publications/tech-reports/reports.04/TCD-CS-2004-04.pdf, last accessed Mar. 2, 2006.

Chatschik Bisdikian, et al. "Intelligent Pervasive Middleware for Context-Based and Localized Telematics Services", International Workshop on Mobile Commerce, Proceedings of the 2nd International Workshop On Mobile Commerce, pp. 15-24, Sep. 28, 2002.

Frank Kargl, et al. "Smart Reminder- Personal Assistance in a Mobile Computing Environment", 6 pages, accessible at http://www.cs.uoregon.edu/research/wearables/cscw2002ws/papers/Kargl.pdf, last accessed Mar. 2, 2006.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

International Search Report and Written Opinion for PCT/US2007/014405 mailed Dec. 11, 2007.

* cited by examiner

METHODS AND ARCHITECTURE FOR LEARNING AND REASONING IN SUPPORT OF CONTEXT-SENSITIVE REMINDING, INFORMING, AND SERVICE FACILITATION

CROSS REFERENCE TO RELATED APPLICATIONS

This application is related to co-pending U.S. patent application Ser. No. 11/428,228 entitled "METHODS AND ARCHITECTURES FOR CONTEXT-SENSITIVE REMINDERS AND SERVICE FACILITATION" (Horvitz, et al.) filed of even date, the entirety of which is incorporated herein by reference.

BACKGROUND

Today, more than ever before, information plays an increasingly important role in the lives of people and businesses. The Internet has transformed how goods and services are bought and sold between consumers, between businesses and consumers, and between businesses. In a macro sense, highly-competitive business environments cannot afford to squander any resources. On the consumer side, time and convenience can be valuable commodities especially when both spouses work outside the home and articles of commerce such as products and services must be procured on a regular basis. Accordingly, information can be utilized for the benefit of all parties.

Network operators and providers (both cellular as well as non-cellular) are spending enormous amounts of money and resources in infrastructure to support bringing more homes and businesses online. For example, cellular operators are scrambling to provide the infrastructure which allows a cellular customer to access IP networks (e.g., the Internet) and associated IP services via the cellular network. Thus, a cellular customer can now purchase a cell phone that allows access to multimedia that is available on the Internet. In another example, a cell phone user can also message an IP node (another user) on the Internet, and read e-mail from the user's e-mail provider based on the Internet. Thus, mechanisms are being put into place to allow for new uses of the information.

For example, users can access weather information via the Internet or have such information transmitted to them in many different ways. Geolocation services (e.g., Global Positioning System) now allow a user to know accurately where they are, that is, user context; this capability becoming more commonplace in vehicles and portable wireless devices, for example. Additionally, sensor systems are utilized more to sense aspects of the user and user environment, and thereafter, using this sensed information to improve user efficiency and management of the user environment.

The Internet and wireless networks continue to serve as catalysts for processing information in new and different ways such as reaching millions of potential customers, for example. In view of such technological advances in hardware and software systems, there is an ongoing and increasing desire to utilize information in combination with these systems to improve the quality of life of individuals and to provide more effective mechanisms for conducting business.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture is a context sensitive reminder and service facilitator. In general, a user can have ongoing needs for a commodity or article of commerce (e.g., gasoline, groceries, medicine, . . . ). The architecture monitors the user context and activity, senses or infers that the growing need should be fulfilled or satisfied, and computes best how to fulfill the need in an optimum way.

For example, the architecture can sense and/or infer that the user has a need for groceries, and broadcasts an inquiry for the items on the grocery list to associated merchants along a path that the user typically travels.

In one implementation, the merchants respond back that some or all of the items on the list are available for purchase at their respective locations.

In another implementation, the various merchants respond back with offers of sale to the user for all available items on the list, to which the user can respond with acceptance or denial of the offers.

In yet another aspect, merchants receiving the inquiry can respond in a bidding or auction fashion in order to gain patronage of the user.

In still another novel aspect, the architecture can also perform cost-benefit analysis for factoring in a number of desired parameters in order to compute cost-benefit data. This data can then be presented to the system user as a means for determining which merchant to select to fulfill the need. Alternatively, this data can be processed automatically without user intervention to make the corresponding merchant selection.

Accordingly, the innovation disclosed and claimed herein, in one aspect thereof, comprises a system for detecting and servicing needs in accordance with a novel aspect. The system includes a needs component that facilitates determination of a need of an entity (e.g., a human), and an analysis component that determines cost-benefit data associated with the need and based on context of the entity. The system can process one or more routes from the current user context or location to an intended destination. The system can learn and reason about these routes, and determine if there are merchants along the routes that can fulfill the user needs.

Moreover, it is possible that a merchant will not be on the route, but off the route some distance (e.g., several blocks or miles). Thus, the cost-benefit analysis can be performed to assess the value in patronizing a merchant further off the route rather than the merchant who is on the route based on, for example, time to travel off the route to get to the off-route merchant, pricing, parking, traffic, and related services nearby. If there are several merchants who can meet the need, the system can further process user preferences as a means for making a selection.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and

DETAILED DESCRIPTION

Figure 1:
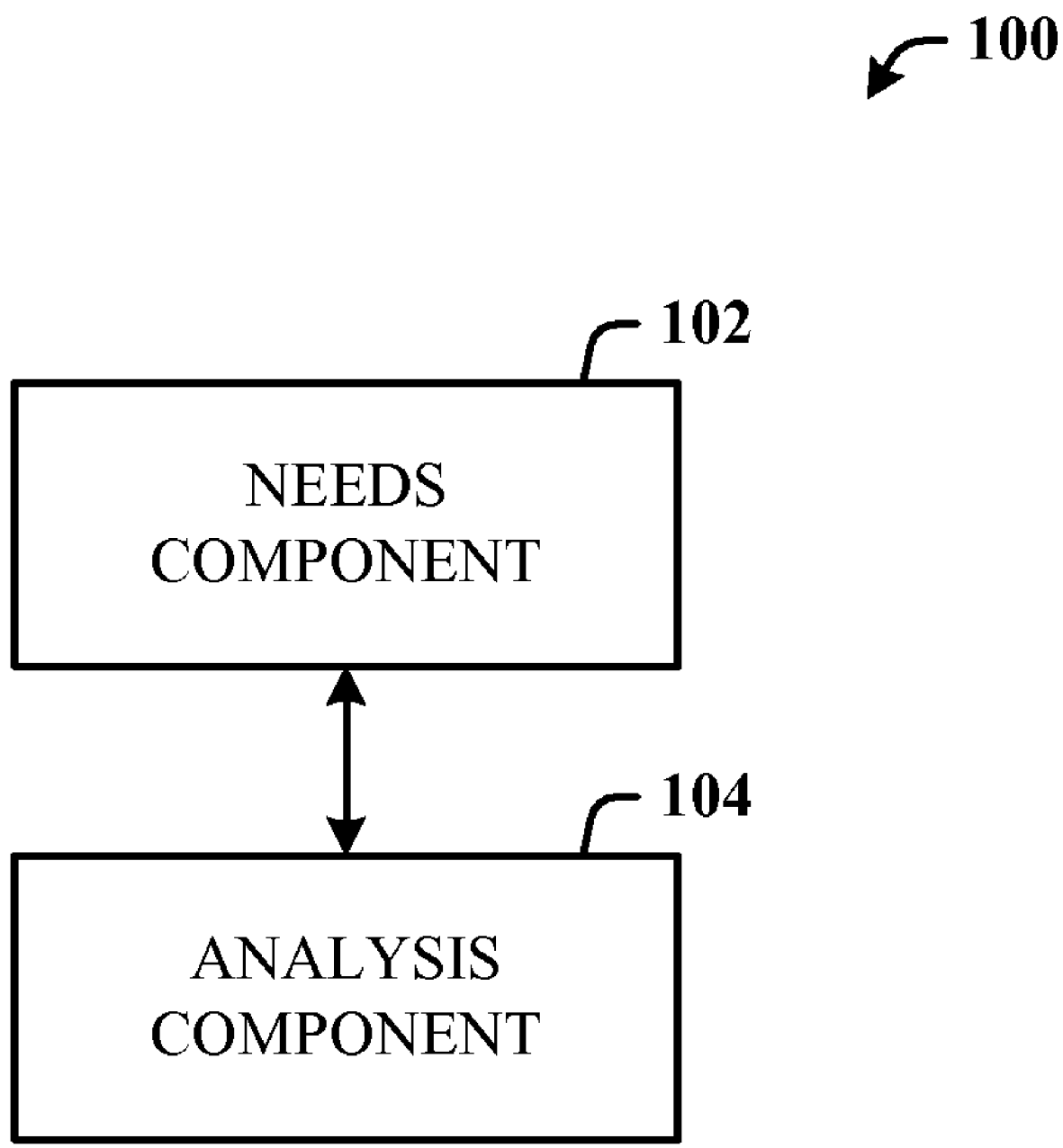
FIG. 1 illustrates a computer-implemented system for detecting and servicing needs in accordance with a novel aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed innovative architecture is a context sensitive reminder and service facilitator. In general, an entity (e.g. a human) has ongoing needs for a commodity or article of commerce (e.g., gasoline, groceries, medicine, . . . ). The architecture monitors entity activity, senses or infers that the growing need should be fulfilled or satisfied, and best how to fulfill the need in an optimum way.

For example, the system can sense and/or infer that a human (or entity) has a need for gasoline soon, and broadcasts a request for the gas to associated vendors or merchants along a path that the human is likely to travel. In response, merchants receiving the request or choosing to respond to the request can bid for your patronage. In another example, hunger can be sensed or inferred in passengers traveling along a route (e.g., traveling individually or as a group on a bus). Accordingly, the transportation service provider can broadcast ahead of time to merchants along the route for food services by stores and other food services businesses. Given that there can be many food merchants, a bidding process can be performed such that the merchant providing the best service, for example, is selected. Other criteria may also be employed (e.g., best prices, fastest service, . . . ). Once the merchant location is reached, the passengers can disembark and receive the food service at the bid price of the selected merchant.

The architecture can also perform a cost-benefit analysis for factoring in a number of desired parameters in order to compute cost-benefit data. This data can then be presented to the system user as a means for determining which merchant to select to fulfill the need. Alternatively, this data can be processed automatically without user intervention to make the corresponding merchant selection.

Referring initially to the drawings, FIG. 1 illustrates a computer-implemented system 100 for detecting and servicing needs in accordance with a novel aspect. The system 100 includes a needs component 102 that facilitates determination of a need of an entity (e.g., a human), and an analysis component 104 that determines cost-benefit data associated with the need and based on context of the entity. In a basic example, the system can sense or infer that the vehicle of a user will need gasoline very soon. In other words, there is a growing need that eventually should be fulfilled or satisfied.

The user also typically travels one or more known paths from work to home, from home to work, etc., for example. Accordingly, the analysis component 104 analyzes routes or paths the user typically takes or is likely to take. The system 100 can then learn and reason about these routes, and determine if there are merchants along the route(s) that can fulfill the need(s). By knowing the present user location (or context), the routes most likely traveled or that can be traveled, are selected for consideration. Moreover, it is possible that a merchant will not be on the route, but off the route some distance (e.g., several blocks or miles). Thus, a cost-benefit analysis can be performed to assess the value in patronizing a merchant further off the route than one who is on the route, for example, based on time to travel off the route, pricing, parking, traffic, and related services nearby. If there are several merchants who can meet the need, the system 100 can further process user preferences as a means for making a selection. Many other aspects are described in detail hereinbelow.

Figure 2:
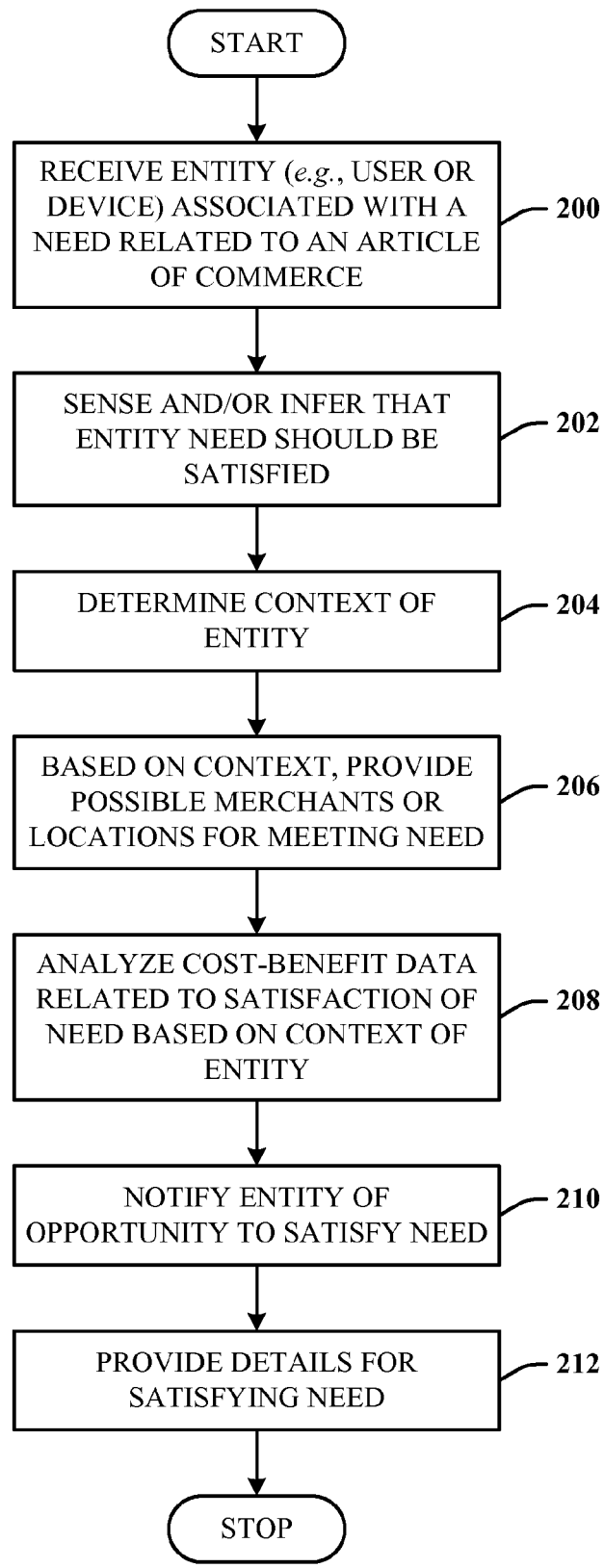
FIG. 2 illustrates a methodology of monitoring and servicing needs of an entity in accordance with another aspect.

FIG. 2 illustrates a methodology of monitoring and servicing needs of an entity in accordance with another aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an entity (e.g., a human or a device) has an associated need related to, for example, a commodity or an article of commerce. At 202, the need is sensed or inferred based on sensor data or inferred based on other information related to the user or device. At 204, the location (or context) of the entity is determined. At 206, based on the context information, the location of one or more merchants or other means for meeting the need, is determined. At 208, a cost-benefit analysis can be performed related to the value in meeting the need by using any one of the merchants or locations. At 210, the entity is notified of the possible options or opportunities for meeting the need and the cost-benefit data in doing so for some or all of the merchants or locations. At 212, further details as to how to get to the merchant and/or location can be provided.

Figure 3:
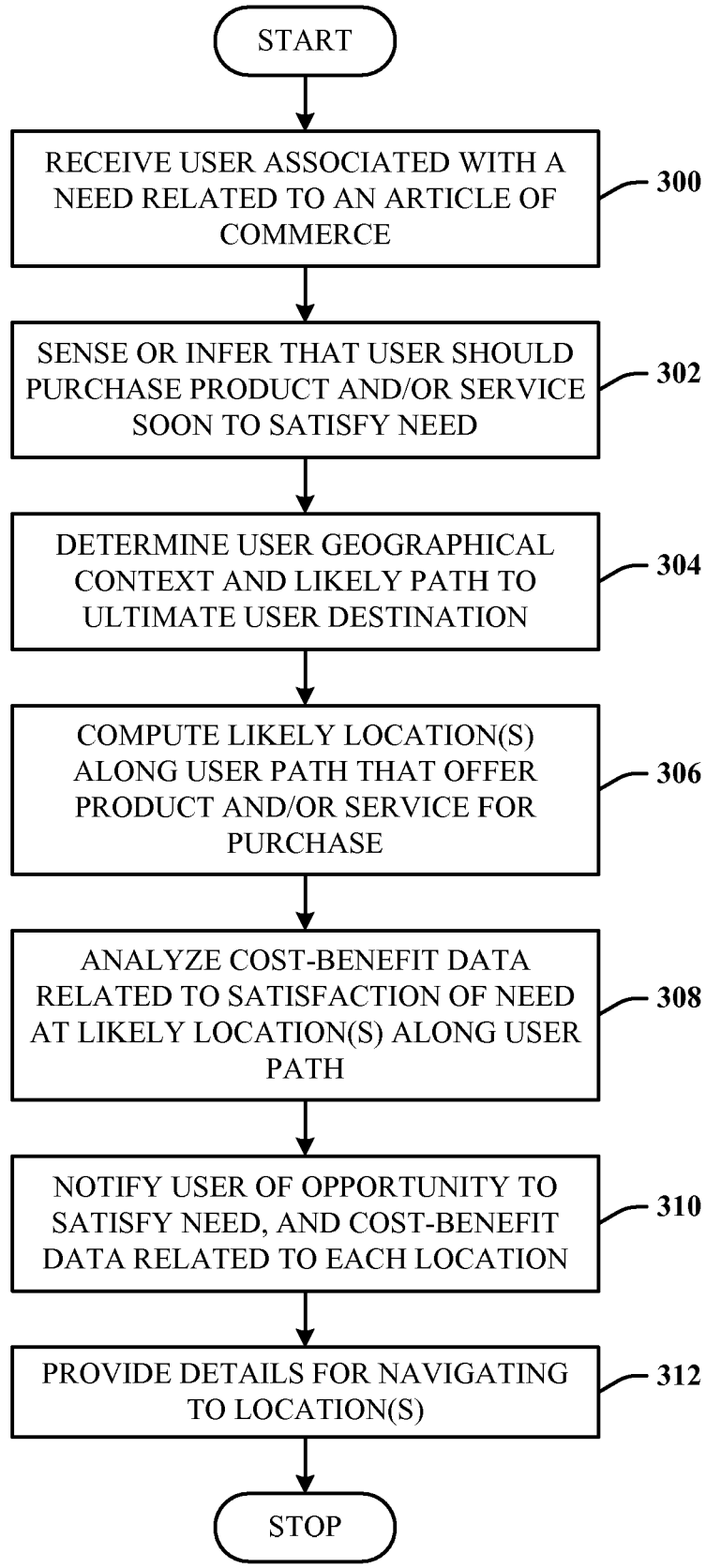
FIG. 3 illustrates a methodology of monitoring and servicing needs of a user in accordance with an aspect.

Referring now to FIG. 3, there is illustrated a methodology of monitoring and servicing needs of a user in accordance with an aspect. At 300, a user has a need related to an article of commerce (a product and/or service). At 302, the system can sense or infer the presence of the need of the user. At 304, the approximate geographical context or location of the user is determined. At 306, based on this context information, likely locations for fulfilling the need are computed. At 308, a cost-benefit analysis can be performed based on the likely locations. At 310, the user is notified of opportunities (e.g., merchants or other locations), and can also be informed of the cost-benefit data computed for each merchant or location. At 312, details can be provided to the user as to how to get to the top three locations, for example.

The user can be notified of other reasons for choosing the top merchants or locations, such as quality of service provided, vehicle or foot traffic along route to get to the merchant or location, availability of the desired product or service, etc. Thus, the final choice can be made by the user, thereby overriding an automatic choice made by the system. This can also be handled by user preferences that are asserted by the user and which are used to filter the potential merchants or other locations, and/or preferences that are learned by the system monitoring user activity over time.

Figure 4:
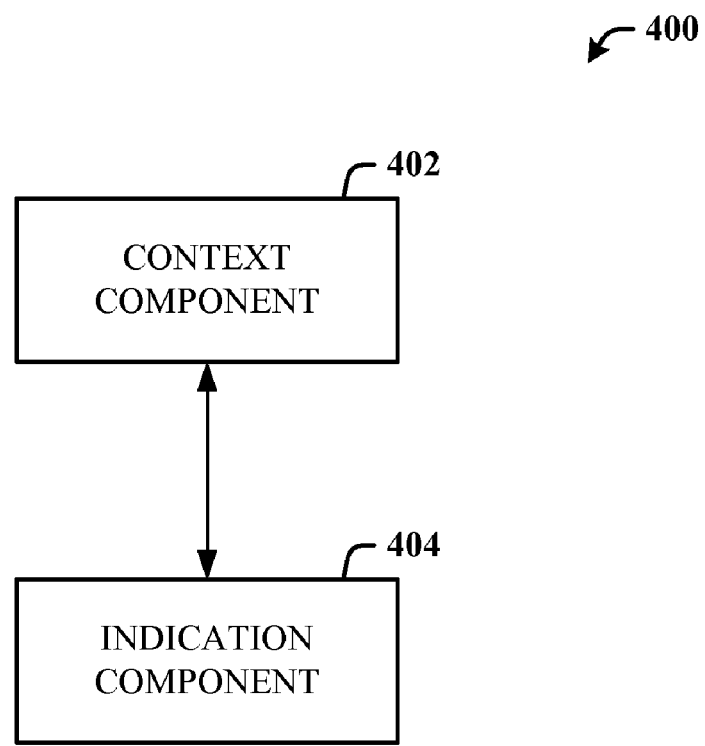
FIG. 4 illustrates a system that facilitates providing opportunistic reminders in accordance with various aspects.

Turning to FIG. 4, illustrated is a system 400 that facilitates providing opportunistic reminders in accordance with various aspects. The system 400 includes a context component 402 that determines a context of an entity (user or device). Further, the system 400 includes an indication component 404 that employs a probabilistic model to identify whether to provide a reminder to the entity based at least in part upon the determined context.

According to an example, the context component 402 can determine a location of a user and/or identify movement of the user. Additionally or alternatively, the context component 402 can analyze the user's calendar to determine that an appointment is scheduled to occur in the near future and/or identify tasks being performed by the user. Pursuant to another illustration, the context component 402 can identify that the user is lacking (e.g., below a threshold) an amount of an item of commerce (e.g., gasoline, food, . . . ). It is to be appreciated that the context component 402 can be tuned to monitor various sources of information (e.g., GPS, calendar, gasoline level, sensor, time since a previous meal, computing device, . . . ) based upon an explicit selection by a user, a preference (e.g., standing user goal that utilizes a particular set or subset of information sources), etc. Further, the context component 402 can dynamically adjust the analyzed information sources over time.

The indication component 404 can analyze the context of the entity and determine whether to provide a reminder to the entity. For instance, the reminder can be audible information and/or visual information (and/or a signal that effectuates presentation of the audible and/or visual information). Additionally or alternatively, the reminder provided by way of the indication component 404 can be a physical movement (e.g., vibration of a device) and/or a signal that effectuates such physical movement.

The indication component 404 can yield reminders related to any fact. For instance, the indication component 404 can provide reminders to the entity pertaining to birthdays, proximity to sales, appointments, and the like. Further, the indication component 404 can provide information to the entity to aide a user to recall disparate information (e.g., a name of a person that the user has previously met, details of a topic of discussion for a meeting, . . . ). According to an example, to assist the user to recall a person's name (e.g., who is scheduled to be at an upcoming meeting), the indication component 404 can facilitate displaying the person's name and picture. It is to be appreciated that the claimed subject matter is not limited to the aforementioned examples.

The indication component 404 can provide reminders based upon considerations of relevance, user knowledge, value of the knowledge, and/or expected value (e.g., based on timing and cost of informing the user). The indication component 404 can evaluate one or more of these considerations based upon the identified context from the context component 402.

The system 400 can utilize models of memory, forgetting, and reminding within any time frame. As such, longer time frame analysis can be associated with providing reminders related to birthdays, upcoming meetings, and the like. Further, modeling memory and recall over shorter-time frames can facilitate recovery from interruptions and multitasking.

According to an illustration, while working within multitasking environments (e.g., by employing mobile device(s), desktop(s), . . . ), interruptions (e.g., externally and/or self-caused) can lead to a user shifting her attention from a first task to a new and/or disparate task. The change in attention can lead to suspending the first task prior to completion. As such, the user oftentimes can forget about the suspended task. On other occasions, the user can remember that she was previously working on a suspended task and return to the task to complete and/or make further progress on it; however, upon returning to the first task, another remembering problem can exist—namely, that of the user not recalling where she was on the first task (e.g., visually/structurally and/or cognitively).

To address reminding over shorter time frames, the context component 402 can examine properties of task(s), state(s) of the task(s) at suspension(s), nature of cause(s) for the suspension(s), and/or characteristics of the suspension(s) (e.g., length of time, whether the attention of the user was diverted away from a device such as a task on a desktop being interrupted by a phone call, . . . ). Further, the indication component 404 can make inferences about if, when, and how to provide cues/reminders to remind/refresh a device (e.g., desktop, mobile, . . . ) to return the user to the suspended task. For instance, the reminders can be linked to system tools that can bring back one or more applications, screens, etc. to enable utilizing an overall computing context as part of the reminder.

By way of illustration, a user can be performing the task of typing an email when interrupted by a knock on the door. The change in the user's attention can be detected (e.g., utilizing sensors that can monitor the user's motion, sounds within the environment, visual information, . . . ). Further, the state of the task just prior to the interruption can be evaluated; thus, for instance, a determination can be made that the task was suspended while editing a portion of a sentence in the middle of a paragraph included in the email. Accordingly, reminders can be provided to enhance the user's ability to recover from the interruption and recall that she was performing the suspended task (e.g., composing the email) as well as where the task was suspended prior to the interruption.

Reminders (both with shorter and longer time frames) provided by way of the indication component 404 can be yielded within desktop computing, mobile computing, and/or non-computing situations. For example, a user can be performing a task or preparing to perform a task (e.g., traveling to perform the task) in the world, which can be recognized by the user's location, patterns of motion, and other activities (e.g., by way of utilizing the context component 402). Progress on such task or preparation can be halted and the user can switch to a disparate task such as, for example, in response to a conversation, news alert, phone call, etc. A computing system, employing models and methods described herein, can be applied to assist users in busy, disruptive environments filled with multitasking.

Figure 5:
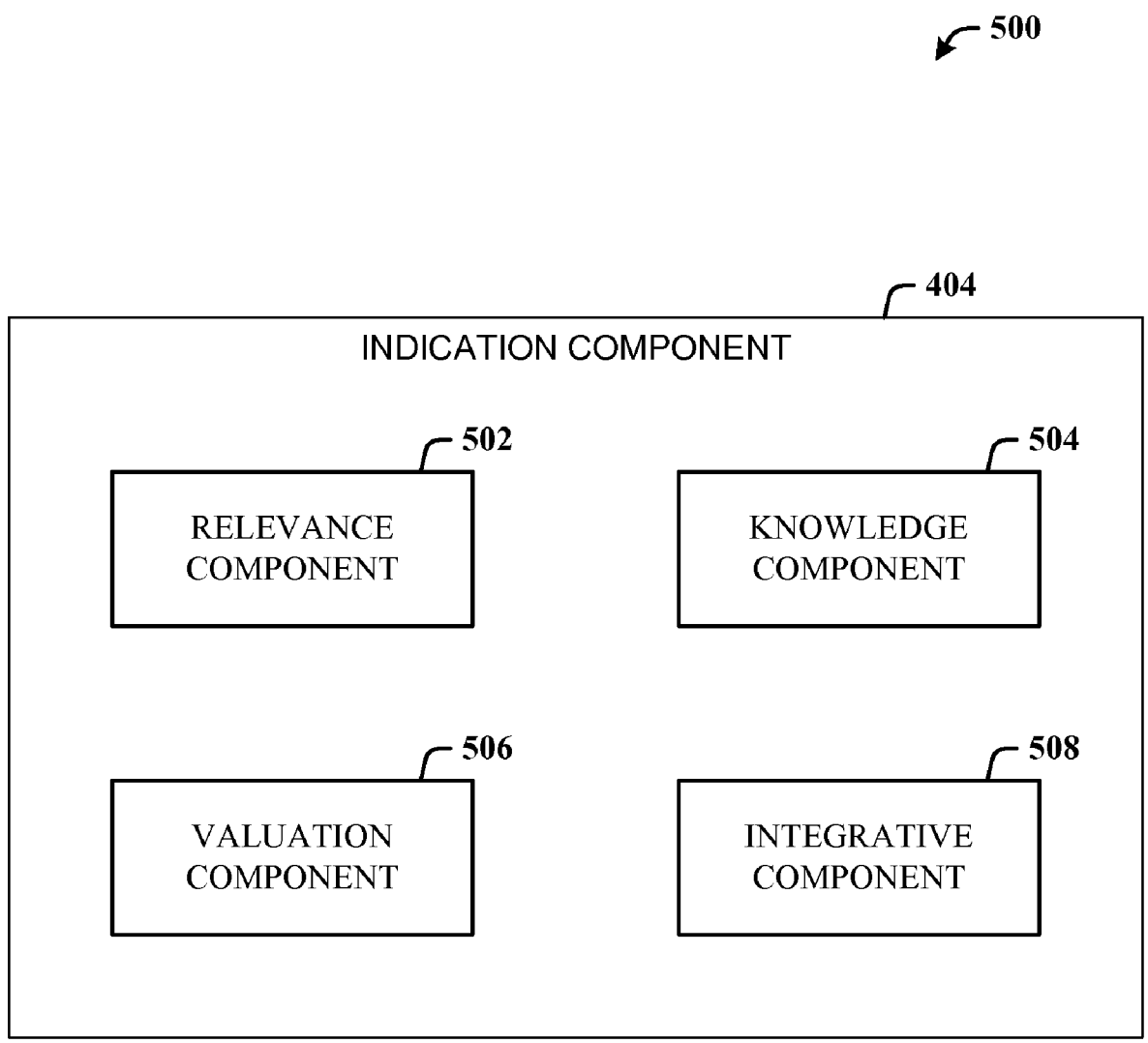
FIG. 5 illustrates a system that identifies whether to output a reminder.

Now referring to FIG. 5, illustrated is a system 500 that identifies whether to output a reminder. The system 500 includes the indication component 404, which can analyze whether a user has forgotten information and/or whether to remind the user of such information. The indication component 404 can include a relevance component 502 that analyzes whether information is relevant and a knowledge component 504 that determines whether the user knows and/or will recall (e.g., within a (predetermined) time frame) the information. Further, the indication component 404 can include a valuation component 506 that analyzes a value of the user knowing and/or being reminded of the information. The indication component 404 can also include an integrative component 508 that can consider the expected value of reminding the user. For instance, the integrative component 508 can determine a timing and cost of information to the user, given the cost of interrupting the user now or at different times in the future, and the cost of lost opportunities with delayed relay of the information. Further, the integrative component 508 can consider standing goals of a user such as types of information that the user desires to be reminded about (e.g., birthdays, gasoline stations when a fuel level is below a threshold, . . . ). The indication component 404 can selectively output reminders based upon the evaluations of one or more of the relevance component 502, the knowledge component 504, the valuation component 506, and/or the integration component 508.

Figure 6:
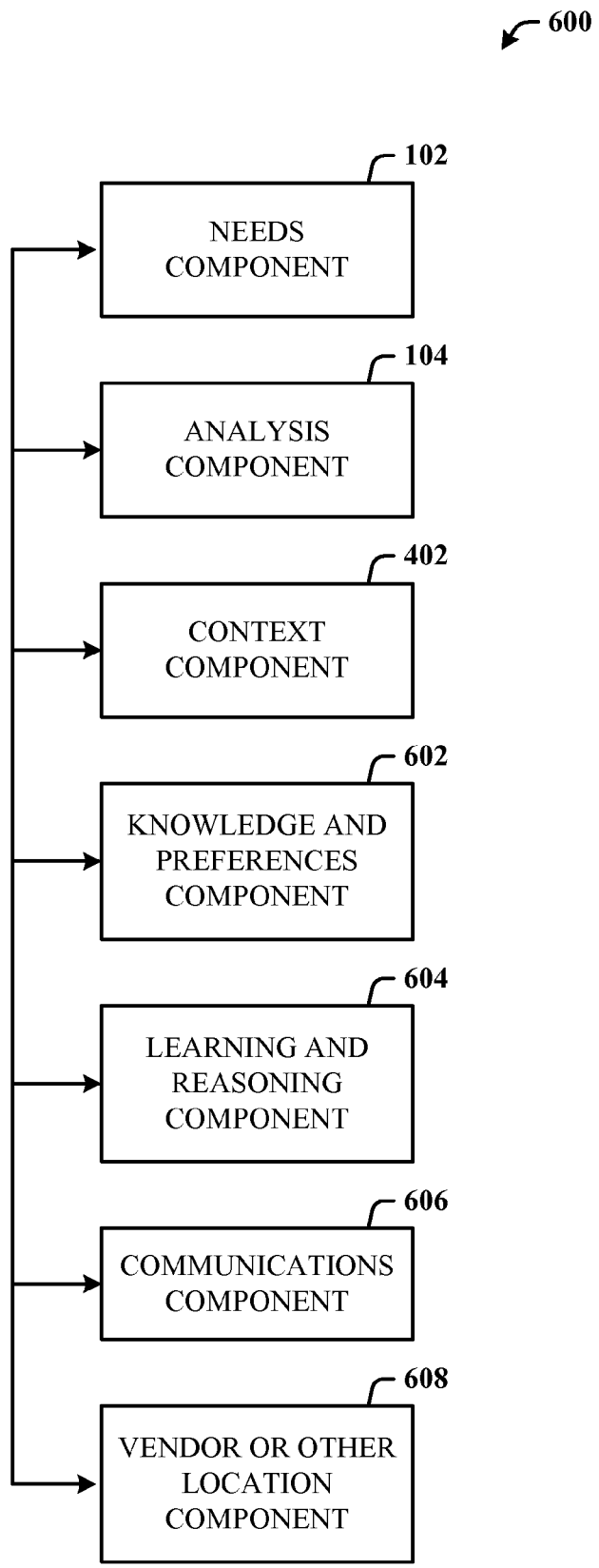
FIG. 6 illustrates a system that includes additional capabilities for optimum needs processing and servicing in accordance with another aspect of the innovation.

FIG. 6 illustrates a system 600 that includes additional capabilities for optimum needs processing and servicing in accordance with another aspect of the innovation. The system 600 includes the needs component 102 and analysis component 104 of FIG. 1. Additionally or alternatively (although not depicted), the system 600 can include the indication component 404, the relevance component 502, the knowledge component 504, the valuation component 506, and/or the integrative component 508 of FIG. 5. Further, the context component 402 is provided for determining the context (or location) of the entity (user or device), as well as a knowledge and preferences component 602 that processes user preferences and can also consider knowledge of the user or device. This is described in greater detail infra and/or can be similar to the knowledge component 504. A machine learning and reasoning component (MLR) 604 is provided for monitoring user and/or system activity, and facilitates automating features or aspects based on the user and/or system activity. A communications component 606 facilitates communications between the user/device and one or more merchants or other locations that can fulfill the sensed or inferred need. A vendor or other location component 608 is capable of receiving a request for the need, processing the request against available products and/or services, and responding to the need via the communications component 606.

The subject innovation can employ various MLR-based schemes for carrying out various aspects thereof For example, a process for modifying user preferences based on learning and reasoning about user activity can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one example, the MLR component 604 can learn and reason about routes or paths the user can take, based on what the user has taken in the past, and will likely take under present circumstances or in the near future. For example, if the determined need is gasoline, the system can reason that since the user has typically satisfied the need by stopping at a Merchant C along Highway Z, there is a high likelihood that the user will again use Merchant C along Highway Z to meet the need. The system can further learn and reason the time of day, day of week, and amount needed to fulfill the need based on past data. For example, the amount of remaining gas in the vehicle can be sensed and used as data to predict future action of the user. This can further be based on the context of the user. For example, if it is learned that in the past before the user purchased the gas, the user context was at work and the destination was at home, it can be inferred that the need for gas can again be fulfilled when the user starts are work and ends at home.

In another example, the system can learn the patterns of patronage at one or more merchants by others and/or by the user. This information can then be used to notify the user or to factor into the coast-benefit analysis the cost of patronizing the merchant at a given time.

Automated learning and reasoning can be particularly useful related to considering the knowledge that a user has of certain things or lack thereof, and the user's ability to recall information when it might be useful to them (in connection with the indication component 404). According to an example, the relevance component 502, the knowledge component 504, the valuation component 506, and the integrative component 508 can each include corresponding MLR components similar to the MLR component 604. Thus, these MLR components can facilitate making inferences as described below.

User knowledge can include facts, tasks desired, needs, and potential opportunities. Lack of knowledge can include what the user never knew or once knew but has forgotten, or that is known but is not accessible within the current context or within the time frame when it may be valuable or most valuable to the user.

Users can be provided with tools for representing in an explicit manner the types of things that they would like to reminded about in different settings. In addition or instead, a system might learn from watching or from explicit feedback about knowledge that a user wishes they would have had in different settings, about the value of knowing, and about the lower-level relevance of knowing things in different settings.

In an embodiment, a user can specify high-level or more detailed preferences and goals that define classes of knowledge as being relevant, or having some significant likelihood of being relevant.

Machine learning and reasoning methods can be utilized to build components that can deliberate on a user's behalf about one or more of: (1) the likelihood of different facts about the world being relevant (e.g., the relevance component 502), (2) the likelihood that a user knows about relevant facts, or will recall relevant facts (including longer-term goals of the user), within some reasonable time frame (e.g., the knowledge component 504), and (3) the value of the user knowing, via being reminded about, or being told about the facts (e.g., the valuation component 506). Finally a system can consider the (4) timing and cost of informing the user, given the cost of interrupting the user now or at different times in the future, and the cost of lost opportunities with delayed relay of the information (e.g., the integrative component 508).

In recommending unplanned, opportunistic expenditures of time or other resources to address previously specified or recently identified potential goals, a system can also compute the cost of the user investing time now versus in the future based on a consideration of the current or future cost of time (or other resource) to the user and the amount of investment in time (or other resource) that may be required to acquire a goal or a portion of the goal.

All of the factors above can be asserted as logical relationships or might, more generally, be inferred as likelihoods from predictive models, e.g., that output probability distributions over different states of the world or over states of a user's cognition or preferences, such as the state of a user's knowledge or the state of a user's sense for the value of knowing something or achieving a portion or all aspects of a goal.

Several dimensions of automated reasoning can be utilized with an automated reminder system that might continue to deliberate about the value of a user knowing about opportunities for enhancing the user's happiness, potentially represented by the likelihood of achieving a set of prespecified goals, some of which may be recurrent. More directly, seeking to maximize a user's happiness or contentment might be represented by the maximization of the expected utility for the user, based on the user's preferences.

A system can represent the likelihood that knowledge k about one or more factoids is relevant in a context. Learning and reasoning machinery can be utilized that considers multiple aspects of context (e.g., obtained by way of the context component 402), including as examples such evidence as the user's location, the time, day, and month, more detailed calendar information such as that describing a holiday, or the topic, location, and attendees of a forthcoming meeting, the status of expendable resources, and proximal businesses, services, terrain, or recreational facilities. Context can be used to represent a situation and it can be assumed that the contextual cues are available as a vector of evidential observations that might be available to a learning and reasoning system.

Consider, as an example, that someone is heading to a party where they will be seeing a large number of people, many of whom they have met in the past, some of whom they may not have seen for an extended period of time. According to this example, decisions can be effectuated about whether to quietly remind a user via a headset or a personal display about k, where k is the name and/or background of people at the gathering. However, many other examples will also suffice to highlight the points, including such k as "need to purchase gasoline within time t," "need to mail a time-critical letter by 5 pm, etc.," "need to allocate time to buy a gift for my mother so as to not miss her birthday next year," etc.

The relevance component 502 reasons about the likelihood that potential factoids are relevant to a user, written as relevant (k), in different situations, computing the probability, p(relevant(k)|context).

The knowledge component 504 (e.g., a user-knowledge module) considers whether or not a user knows about k, written knows(k). This can alternatively be expanded to include the likelihood that a user will recall k within some time frame, t. The knowledge component 504 continues to compute the probability, p(knows(k)|context).

The valuation component 506 (e.g., a knowledge-valuation module) computes the value of a user knowing k within a context, or for any context, in a situation where they do not know k or would not recall k within an effective time horizon. As described below, an expected value of reminding a user can be computed, considering a user's knowledge about k as uncertain.

The valuation component 506 can continue to compute a value of being informed about the fact k (e.g., utility of being informed about k) by analyzing a difference between a value of knowing versus not knowing k within the context. For instance, the valuation component 506 can evaluate:

Value of being informed about $k$=Utility (know($k$))−Utility(not know($k$))

which can be rewritten as,

Utility(informed($k$)|context)=Utility(know($k$)|context)−Utility(not know($k$)|context)

This might further be considered in terms of a threshold value, in the following manner:

$u$(informed($k$)|context)>threshold value.

The integrative component 508 (e.g., a integrative module) in the reminder system more generally considers the expected value of reminding someone about k. The expected value is a function of whether k is both relevant and not known or not recalled within an effective time frame, and the cost of informing someone who may be doing something else and thus view the reminder as a costly nuisance.

According to an example of a reminder system, the integrative component 508 can compute the value of reminding a user about k as described as follows. First the system computes the likelihood that a user knows k already and will remember k within the context, $p$(know($k$)|context)=
$p$(know($k$)|relevant($k$),context)*$p$(relevant($k$)|context)

The system then computes the likelihood that a user does not know or will not recall k in the context. This is simply the complement of the likelihood that a user knows k, $p$(not know($k$)|context) = 1 − $p$(know($k$)|context)

= 1 − $p$(know($k$)|relevant($k$), context) *
$p$(relevant($k$)|context)

Thus, for instance, the integrative component 508 can compute the probability that a user does not know k, given a probabilistic combination of the probability that k is relevant in a context and the probability that a user would know k, given that k is relevant. The cost of informing a user should they already know k can be considered as the cost of the potential interruption and processing. Given the system may be uncertain as to whether a user knows k or not within a setting, the expected value (eu) of informing the user (eu (inform(k)|context) can be computed as $eu$(inform($k$)|context)=$p$(not know($k$)|context)*[$u$(know($k$))−$u$(not know($k$)|context)]−cost(interruption(inform($k$))|context)

Rich statistical models can be constructed from training data about p(know(k)|context). Machine learning and reasoning can be decomposed into components that reason for each k, whether a user has known k in the past, e.g., p(knew(k)|user experiences), and consider the likelihood of recall given this probability. For example, models can explicitly reason about the probability that a user will know k given that a user may have known k in the past, and compute p(know(k)|context) in advance of being told, as $p$(know($k$)|experiences)=
$p$(know($k$)|knew($k$))*$p$(knew($k$)|experiences)

Experiences can include logs of what a system has told a user in the past, as well as other historical representations of the details or higher-level, more abstract descriptions about a person's life (e.g., "lived in Boston, Mass. for 5 years, from 1990-1995," etc.)

Models can be built that further consider memory cues associated with a current context as having an influence on the recall of a previously known k.

$p$(know($k$)|cues(context))=$p$(recall($k$)|knew($k$), cues (context), experiences)*$p$(knew($k$)|experiences)

Likewise, the likelihood that a user will forget or not something that they have seen or learned in the past in a current context can be considered, based on the time that has transpired from the learning or last recall or usage, and potential distractors in the intervening time and or within the current context. The likelihood that a user recalls k can be represented as 1−p(forget(k)|knew(k), factors f that might lead to forgetting)

$p$(know($k$)|cues(context)) =

(1 − $p$(forget($k$)|knew($k$), factors $f$, experiences)) *

$p$(knew($k$)|experiences)

where factors f include such properties as: age of user, memory of user, time since learn k, time since last access k, complexity, other distinguishing features of k, similar of k to other k's, etc.

Figure 7:
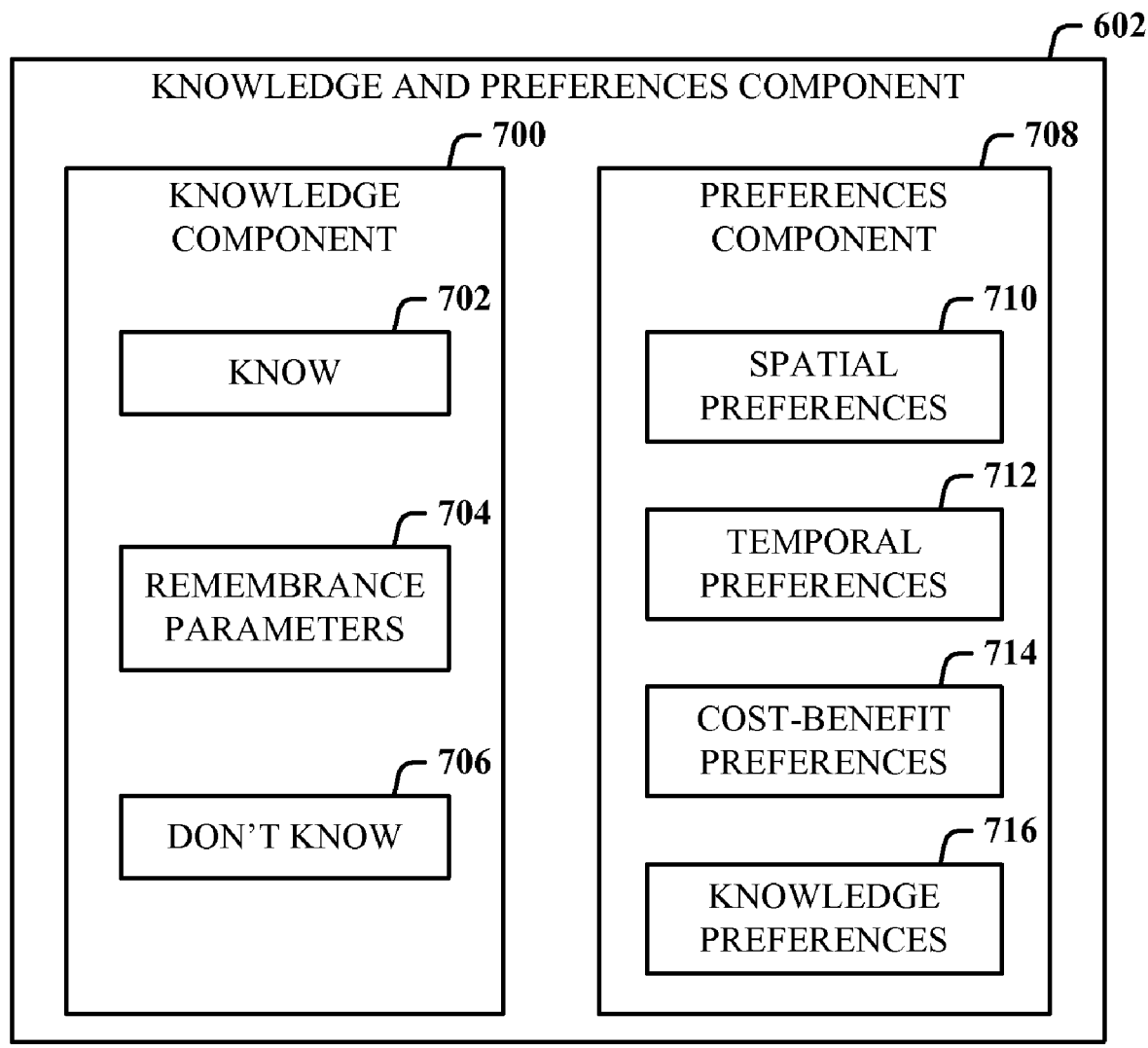
FIG. 7 illustrates a more detailed block diagram of the knowledge and preferences component.

FIG. 7 illustrates a more detailed block diagram of the knowledge and preferences component 602. The component 602 can further include a knowledge component 700 that considers what the user knows, does not know, and can remember, for example. Accordingly, a know subcomponent 702 stores information about what the user (or device) knows, a remembrance subcomponent 704 stores information about what type of information the user has remembered in the past, has not remembered in the past, and based on this past information, what the user is likely to remember and is most likely to not remember.

A preferences subcomponent 708 stores and provides user preferences for processing as a means of filtering various data associated with the needs determining and needs servicing process. For example, a spatial preferences subcomponent 710 stores preferences data related to location information (e.g., geographical). Here, the user can specify that he or she will only consider locations within one mile off a routinely traveled route. In another example, the user can specify a preference of only considering merchants or locations within fixed distance from work or home. A temporal preferences subcomponent 712 stores preferences information related at least to time. For example, if the user or device prefers to consider fulfilling the needs early in the morning (e.g., within a 1-hour window) or on the way home from work (e.g., within a 2-hour window along a new route), this can be factored in when making selections of merchants or other locations, and performing cost-benefit analysis. In another example, the user can specify that they prefer to address the needs within an amount of time from a desired destination (e.g., home). Thus, only merchants or locations normally considered within, for example, thirty minutes from home will be considered.

When using this type of requirement or rule, other factors can enter in that change what the user or system would consider to be within thirty minutes from home. For example, if the user is thinking of a merchant that would normally be considered within thirty minutes from home, but road construction in the area can cause a delay (e.g., as computed under analysis) that exceeds the 30-minute rule, the merchant would no longer be considered. However, the MLR component 604 of FIG. 6 can be employed to learn and reason about this information, thereby retaining the merchant as an opportunity for servicing the user need.

The preferences subcomponent 708 can also include a cost-benefit preferences subcomponent 714 that allows the user (or device) to enter criteria that drives the cost-benefit analysis process. For example, the user can assert an ratio that must be met (e.g., benefit over cost 3:1) for the location or merchant to be presented to the user for consideration. A knowledge preferences subcomponent 716 can includes the names of merchants that the user prefers to use. For example, after the cost-benefit analysis has been computed, or as part of the analysis computation, the user can override or weight one merchant selection over another via the knowledge preferences subcomponent 716. Example rules can include "Choose Merchant A over Merchant B no matter what the cost-benefit data when addressing a need related to medical drugs" or "Choose Merchant A over Merchant B irrespective of the cost-benefit data when addressing a need related to medical drugs". Other examples include "Choose only merchants that the user currently knows about" or "Choose only new locations that meet the cost-benefit criteria, and that I do not know about".

Figure 8:
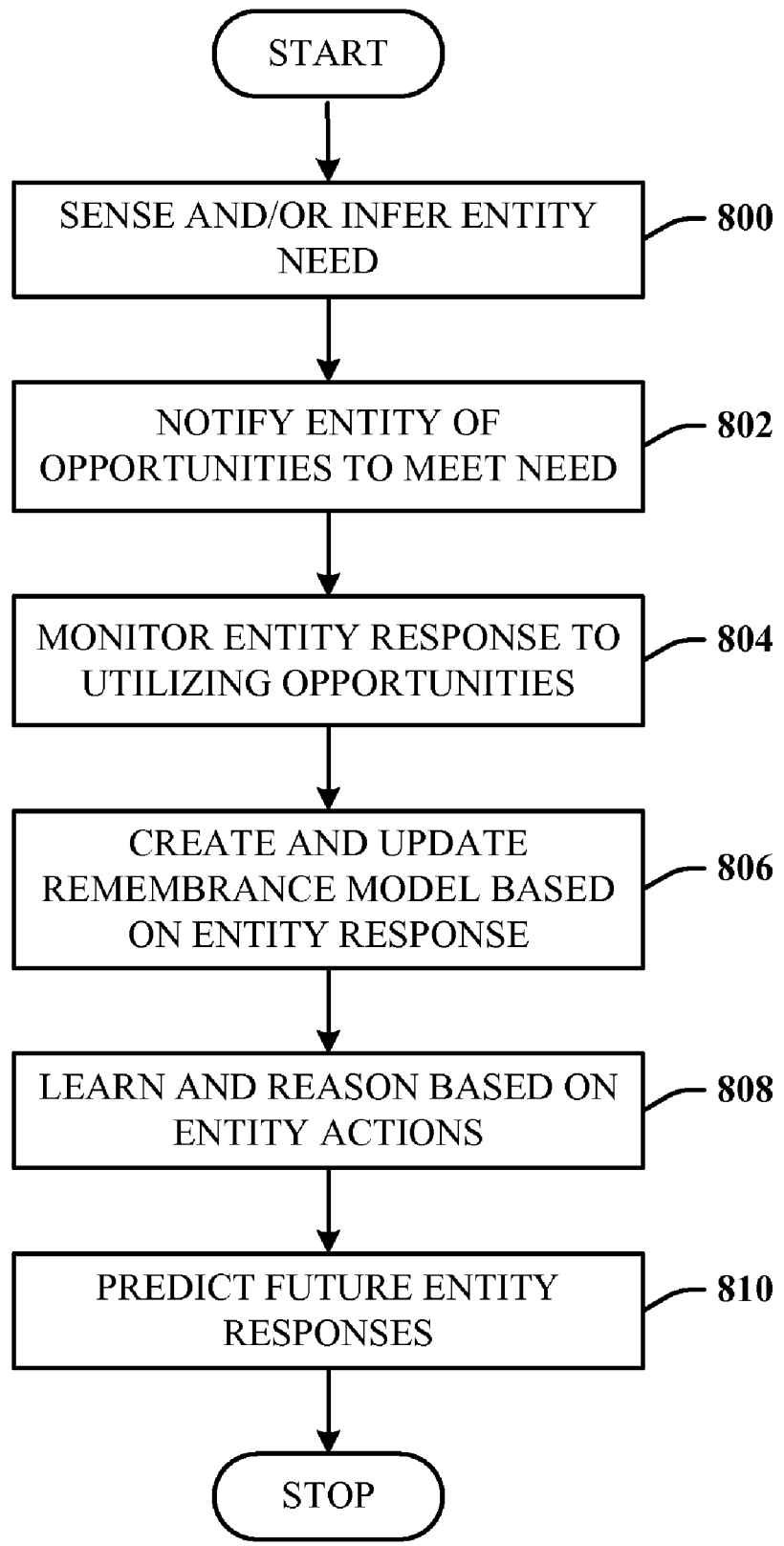
FIG. 8 illustrates a methodology of processing remembrance data accordance with the disclosed innovation.

Referring now to FIG. 8, there is illustrated a methodology of processing remembrance data accordance with the disclosed innovation. At 800, the system senses and/or infers a need of the entity. At 802, the entity is notified of opportunities (e.g., merchants and/or other locations) that can meet the need. At 804, the entity responds to the opportunities. This can include the entity selecting one opportunity and not selecting other opportunities. At 806, based on this selection information, a remembrance model or remembrance data can be created and maintained. Thereafter, the system monitors entity activity to update the remembrance data or model.

In one example, the entity may have been presented the opportunity, selected it, but yet failed to fulfill the need using the opportunity. This can be classified as remembrance information, which can be stored along with other related context information such as the time of day the opportunity was offered, the location of the opportunity, the type of need, the urgency of the need, etc. For example, if the growing need is to replenish a medical prescription that has to do with cognitive ability, and which affects the user's ability to recall, the system can learn and reason about the lack of recall related to this need, as indicated at 808, and move addressing of the need forward in time when the user is inferred (or more likely) to be under better cognitive control to remember fulfilling the need of replenishing the prescription. The system thereby predicts future entity responses, at 810, based on these entity actions.

Figure 9:
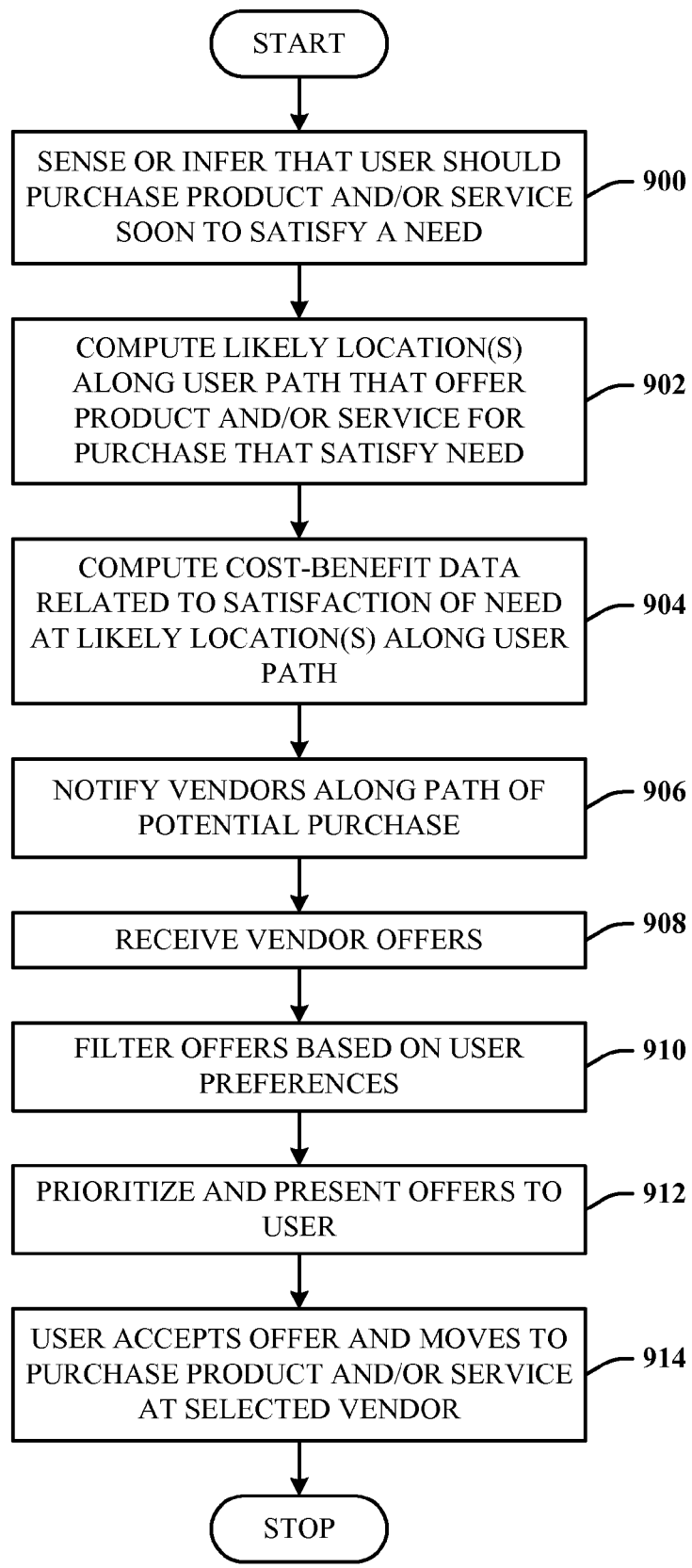
FIG. 9 illustrates a flow diagram of a methodology of processing vendor responses to user needs.

FIG. 9 illustrates a flow diagram of a methodology of processing vendor responses to user needs. At 900, a growing need is sensed and/or inferred such that the user should purchase a product and/or service soon to satisfy the need. At 902, likely locations of merchants along the user path of travel that provide a product and/or service, are computed. At 904, cost-benefit analysis is performed related to satisfaction of the need at likely locations along the user path of travel. At 906, merchants are notified of the user need to purchase available products and/or services. At 908, the merchants compile offers, and send the offers to the user (or user system). At 910, the offers can be filtered based on other information such as user preferences, for example. At 912, the merchant offers are prioritized and presented to the user. At 914, the user accepts an offer, and initiates purchase of the product and/or service from the selected merchant.

Figure 10:
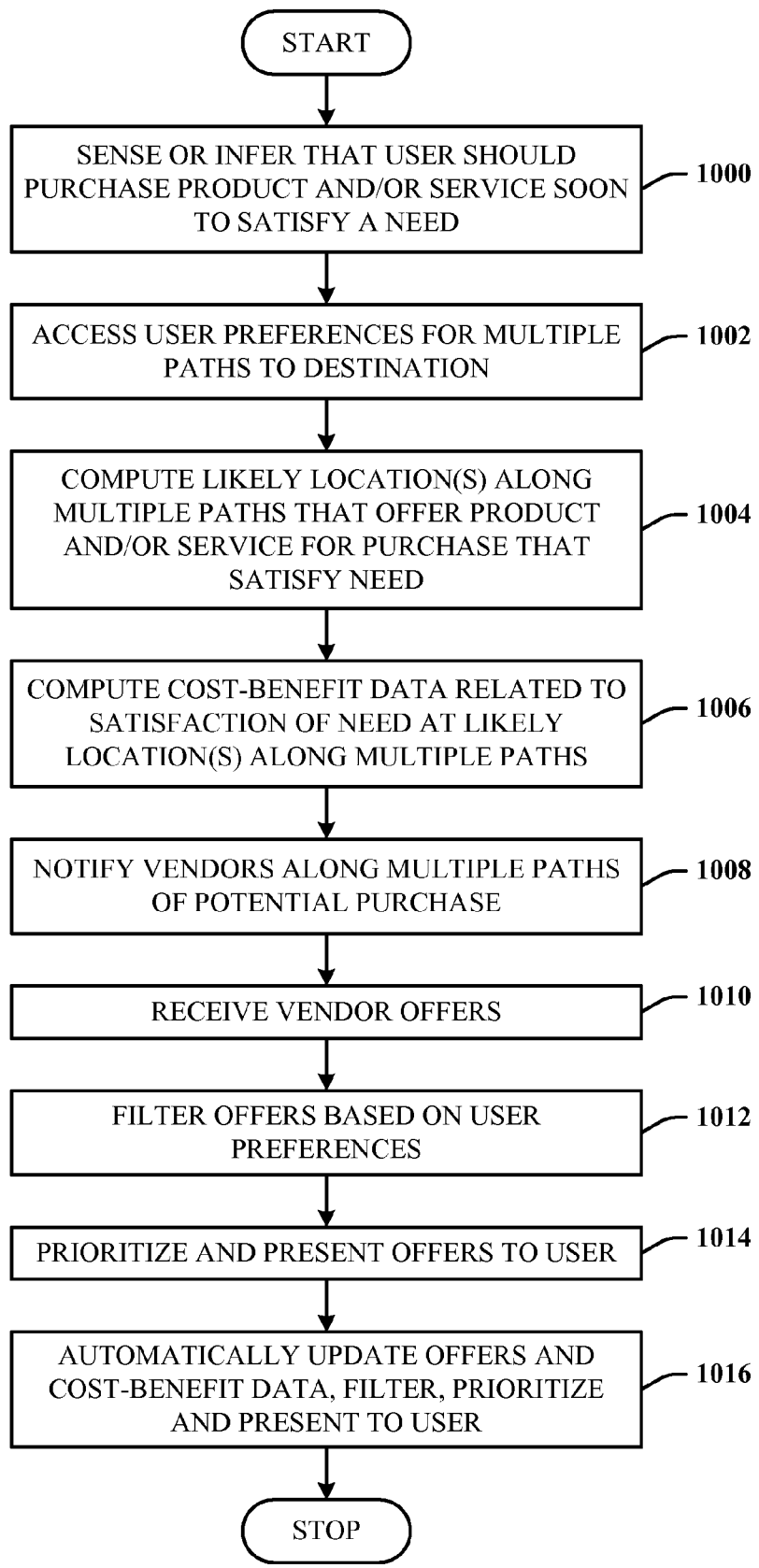
FIG. 10 illustrates a flow diagram of a methodology of processing vendor responses to user needs from vendors along multiple potential user paths.

FIG. 10 illustrates a flow diagram of a methodology of processing vendor responses to user needs from vendors along multiple potential user paths. At 1000, the system senses and/or infers that a user should satisfy a growing need by receiving a suitable product and/or service. At 1002, the system accesses user preferences related to multiple paths to the user destination. At 1004, likely locations along the user paths are determined that offer the article of commerce. At 1006, cost-benefit data associated with each likely location (or merchant) along the multiple paths is computed. At 1008, those vendors that fall within the cost-benefit criteria are notified of the user need. At 1010, the vendors process the need and return offers to the user. At 1012, the offers can be filtered by the user based on user preferences. At 1014, the remaining offer(s) can be prioritized for presentation to the user for final selection. Alternatively, the best offer can be automatically selected and presented to the user.

At 1016, as the user context changes (e.g., the user is in transit), the offers and cost-benefit data can be automatically updated, filtered, prioritized and re-presented to the user for a revised consideration. What this means is that as the user is moving closer to or farther away from the vendor locations, the vendor offers can change. In one example, by changing the offer as the user moves away from the vendor, or as the user appears to be considering a competitor to fulfill the need, this can operate as a means of enticing the user to reconsider the vendor.

Figure 11:
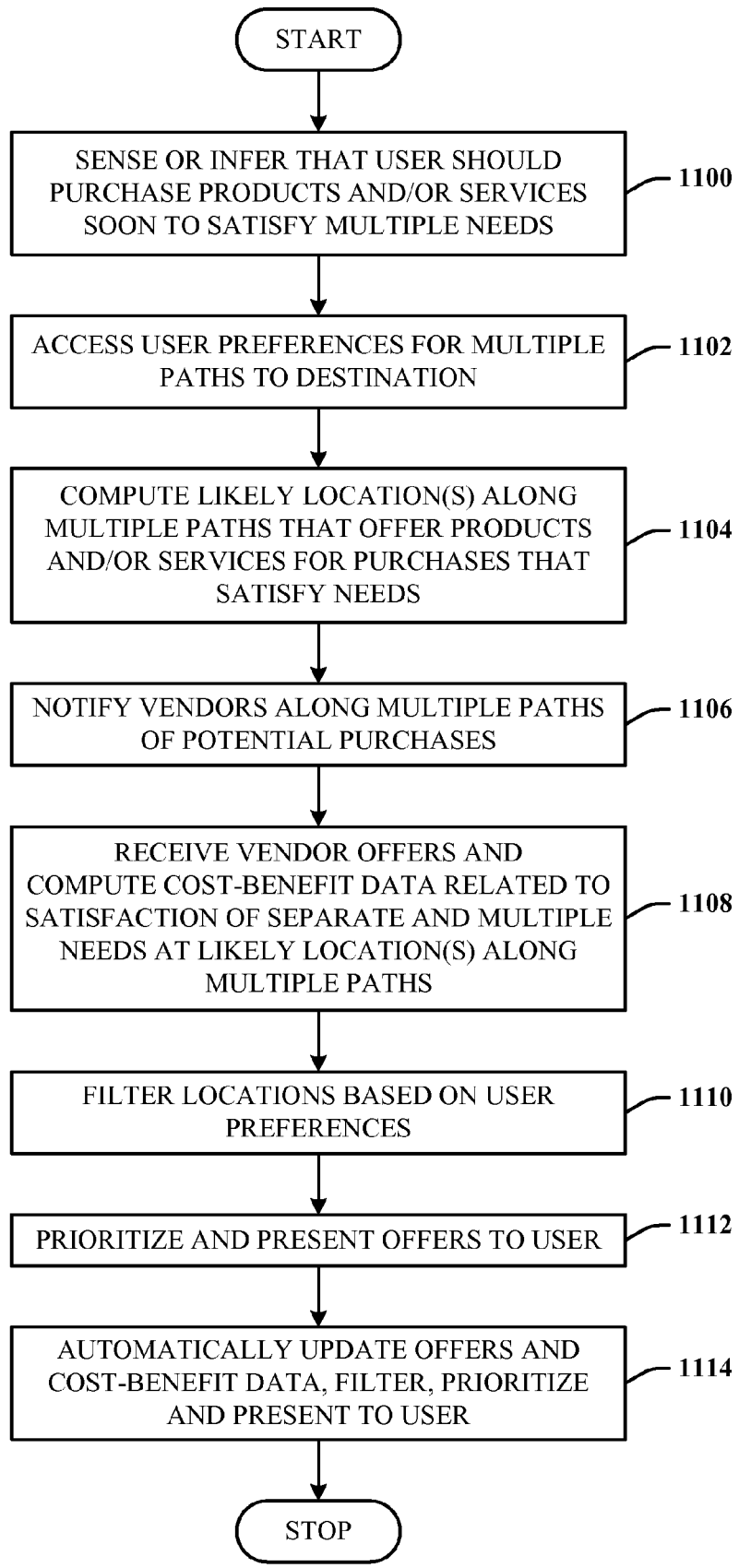
FIG. 11 illustrates a methodology of processing multiple user needs in accordance with an innovative aspect.

FIG. 11 illustrates a methodology of processing multiple user needs in accordance with an innovative aspect. At 1100, the system senses and/or infers that a user should satisfy multiple needs by receiving suitable products and/or services. At 1102, the system accesses user preferences related to multiple paths to the user destination. At 1104, likely locations along user paths are determined that offer the articles of commerce that satisfy the multiple needs. At 1106, vendors along the multiples paths are notified of the needs of the user, and the desire by the user to procure articles that fulfill the needs. At 1108, vendor offers are received and cost-benefit data associated with each likely location (or merchant) along the multiple paths is computed.

Alternatively or additionally, the cost-benefit of taking a specific path that can satisfy some or all of the needs can be computed and considered. For example, if traveling along a first path has three vendors that can satisfy four of the user needs, this can be preferred over a second path that can satisfy five of the user needs, but at a higher cost (e.g., in time or money).

At 1110, again, filtering of locations can be performed based on user preferences. For example, if it is Tuesday, and the user preferences indicate that the user will only be traveling a first path later in the day, then all vendors not on this path can be eliminated as opportunities for meeting the user needs. At 1112, the vendor offers (or opportunities) can be prioritized and presented to the user for selection. The information presented can also be the path of travel to obtain the most fulfillments for the needs expressed.

At 1114, after the user has made the selection, the system can continually provide updates based on any number of factors which can cause the user to reconsider another path of set of vendors. For example, if the system initiates determination of the most optimum path to vendors in the morning and the result is obtained in the morning, the results can change based on changes in conditions that have occurred from the time the first result was computed until the time the user actually departs to make purchases that satisfy the needs. Such changes can include blockage of the paths (e.g., traffic congestion or an accident) to the vendors. Additionally, one or more of the vendors could have sold out of the article of commerce by the time of departure. Accordingly, the update process can include re-computing cost-benefit information, applying knowledge and preferences information, and prioritizing results for presentation to the user and/or user system.

Figure 12:
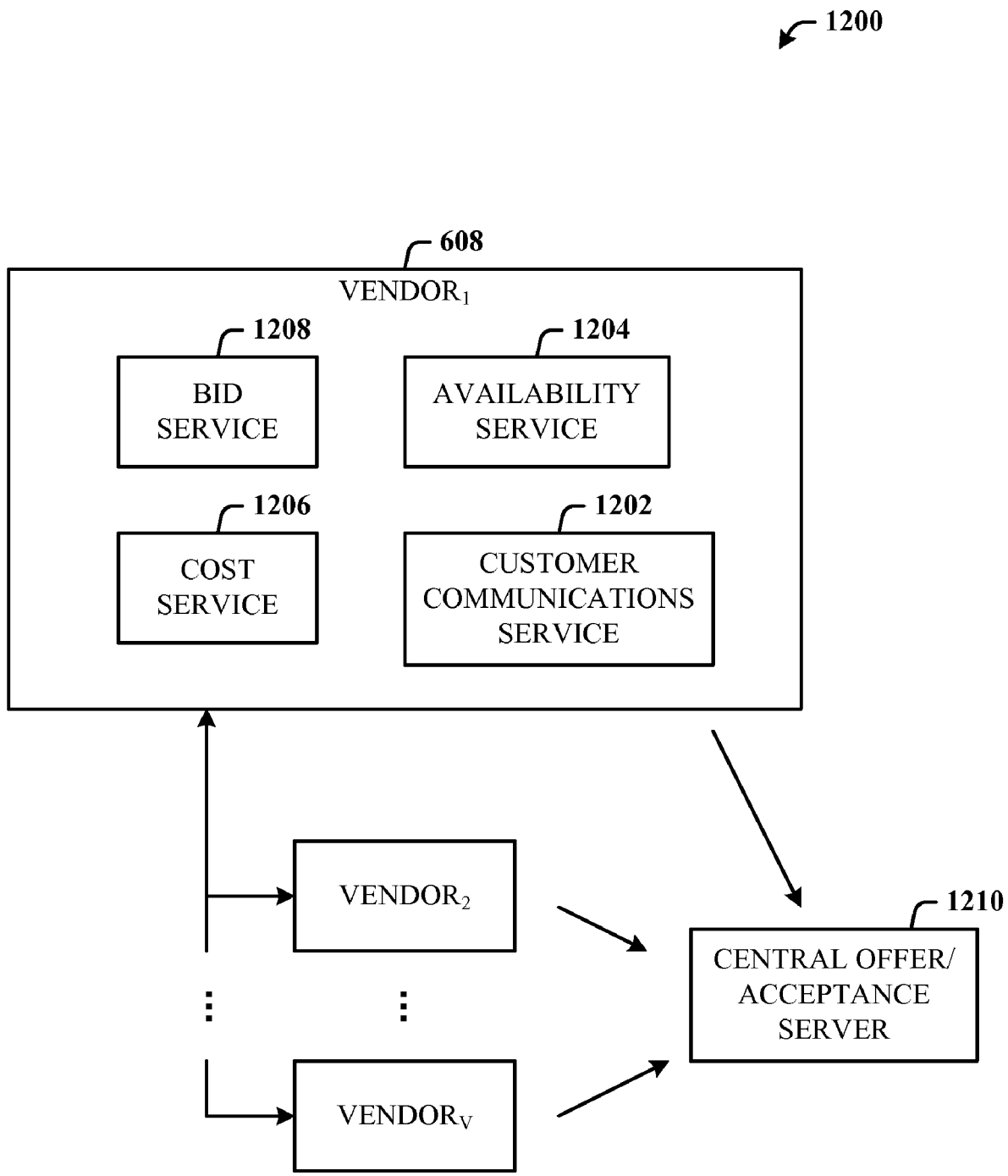
FIG. 12 illustrates an implementation of a vendor system that facilitates needs processing and servicing.

FIG. 12 illustrates an implementation of a vendor system 1200 that facilitates needs processing and servicing. Vendors can have at least systems capability for receiving information, processing requests or inquiries, making offers to the user, processing bids, and completing transactions with the user. Accordingly, the system 1200 can include the vendor component 608 to facilitate some or all of such processes and functions. A customer communications service 1202 facilitates wired and/or wireless communications with one or more users (or customers). This can be via wired and/or wireless mechanisms such as IP-based networks and cellular networks, for example. Thus, e-mail, other messaging systems (e.g., SMS/MMS), voice calls, VoIP communications and the like can be employed for communications between the merchants and users (as well as user and merchant systems).

An availability service 1204 provides access to the vendor inventory of readily available products and/or services and to such articles of commerce that can be ordered, for example. Thus, when the user system transmits an inquiry to the vendor for satisfying a need, the availability service 1204 accesses all vendor information to assess whether the need can be met, the timeframe for meeting the need, quantity, required, and so on. A cost service 1206 can also be included to provide cost information on the products and/or services currently available or which can be ordered for delivery at a later time.

A bid service 1208 facilitates processing user need requests according to a bid process. The disclosed innovation provides an unprecedented transactional environment where a user can "haggle", so to speak, with the vendor over at least price. In a one-on-one example, the user need is communicated to a vendor along the intended route of travel of the user. The vendor responds that the requested article of commerce for satisfying the need is available for purchase at the vendor location and right now. The vendor then communicates the purchase price back to the user, who can then decide whether to proceed with the purchase. Conventionally, it typically is a "take it, or leave it" offer from the vendor. However, given that the vendor now knows of the buying power of many customers, and the ease with which large numbers of potential consumers can seek out competitive offers for products and services, the vendor may tend to be more flexible on prices. That is, the vendor can choose to use the old "take it, or leave it" attitude and risk losing the sale, or reduce the price to make the sale. This sudden change of buyer-seller exchange can happen dynamically between the user and vendor systems, without the need for a face-to-face meeting.

Additionally, as many user systems process corresponding user needs and seek out vendors optimum for user patronization, information for purchases can be received and processed in large blocks. For example, such large blocks of purchasing users can occur right after employees leave work, but before arriving home. Thus, the vendor systems can receive large numbers of inquiries and make offers for sale based on these potentially large numbers. Such capability provides a huge incentive for the merchant to close the sales by reducing the prices to a level that will meet user demands.

Alternatively, a central offer/acceptance server 1210 can be provided where multiple vendors (denoted $VENDOR_1$, $VENDOR_2$, ..., $VENDOR_V$, where V is an integer) communicate offers to potential purchasers for the same or similar products and/or services. The user system can then select the best offer among the many merchants, and further process the routes, cost-benefit data, and so on, as described herein, to determine the most optimum route to meet the need(s).

In yet another implementation, the central server 1210 consolidates user needs requests into blocks of items and/or services for purchase. The many different vendors can then bid on the blocks of items or services, with the lowest bid wining the right to sell the products or services.

In still another implementation, the cost-benefit information can be communicated from the user system to the vendor such that the vendor systems can seek out alternative ways to meet the user need. For example, if, based on received user cost-benefit data, the vendor knows that the user is not likely to make the purchase from the vendor store at this location, the vendor can suggest another vendor-owned location for a reduced price, for example, in order to make the sale.

As can be seen, information can be processed and exchanged in many different ways to enhance customer time, convenience, and buying power, while also providing an improved business solution for reaching more potential customers and increasing sales in competitive markets.

Figure 13:
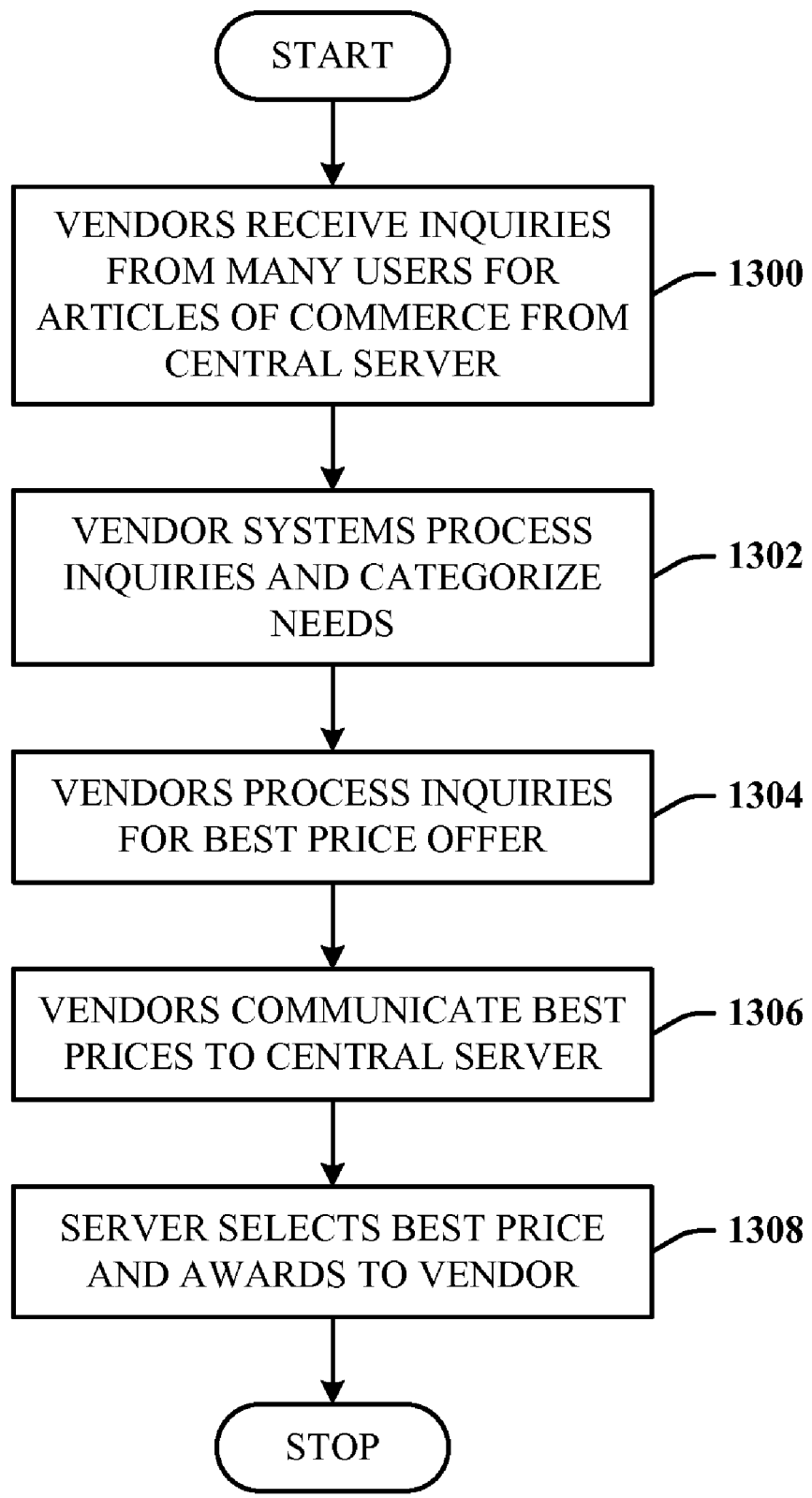
FIG. 13 illustrates a methodology of processing needs information by bidding for customer patronization, in accordance with an aspect.

FIG. 13 illustrates a methodology of processing needs information by bidding for customer patronization, in accordance with an aspect. At 1300, multiple vendors receive inquiries for products and/or services from many different users via a central server. At 1302, the vendor systems process the inquiries according to categories of products and services. At 1304, each vendor processes the inquiries for a best price for each block of products and/or services. At 1306, each vendor communicates the best price to the central server. At 1308, the server selects the best price, and awards to the corresponding vendor.

Figure 14:
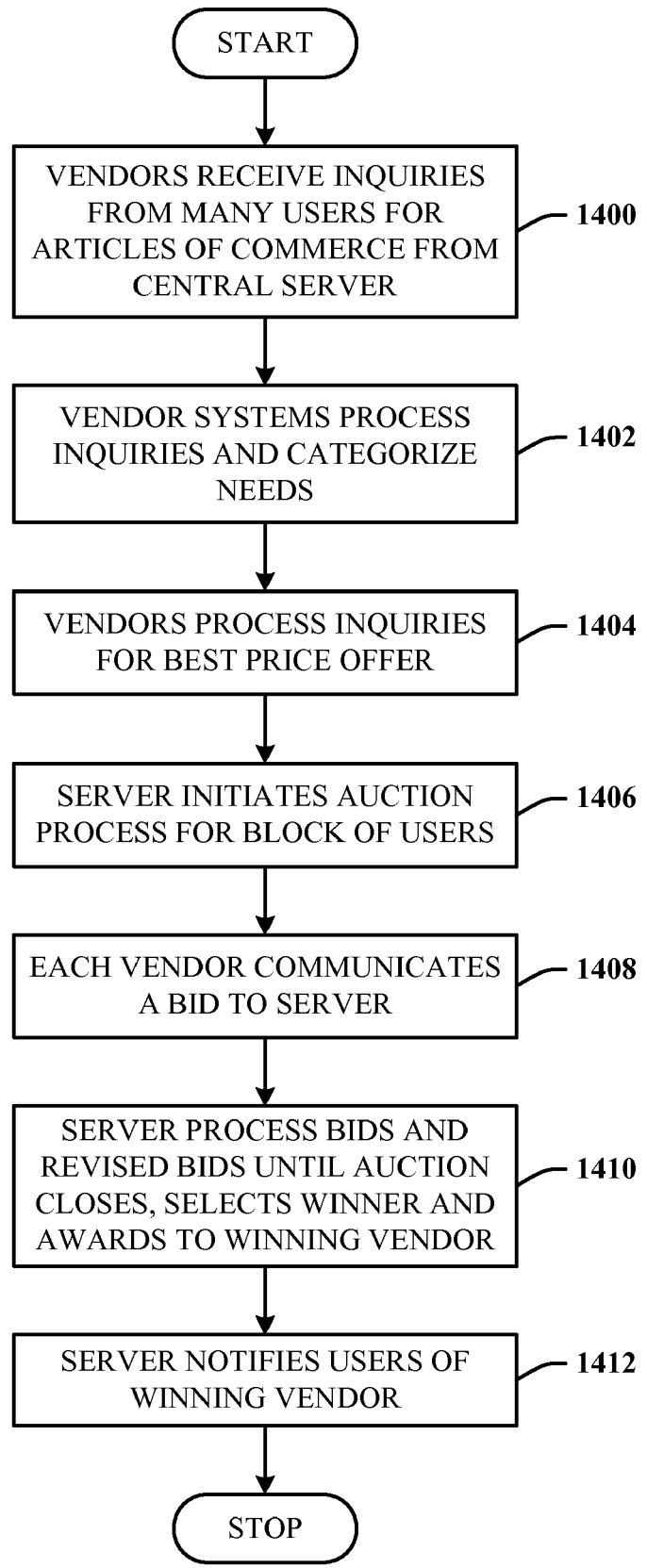
FIG. 14 illustrates a methodology of processing needs information by auctioning for customer patronization, in accordance with an aspect.

FIG. 14 illustrates a methodology of processing needs information by auctioning for customer patronization, in accordance with an aspect. At 1400, multiple vendors receive inquiries for products and/or services from many different users via a central server. At 1402, the vendor systems process the inquiries according to categories of products and services. At 1404, each vendor processes the inquiries for a best price for each block of products and/or services. At 1406, the central server initiates an auction process for the block of consumers. At 1408, each vendor communicates a bid to the central server. At 1410, the server processes the bids and revised bids until the auction closes, selects the best price, and awards to the corresponding vendor. At 1412, the serve notifies the customers of the winning vendor, and other vendor information (e.g., winning price, location, . . . ).

The above mechanisms can find relevance to neighborhoods or suburbs where, for example, many smaller communities can exist with less mobile populations. If commuting longer distances to larger metropolitan settings is less likely to occur, then the locations of merchants along routes of traffic, or departure therefrom factor less into the cost-benefit analysis. Then other factors such as block buying power can weigh more often and more heavily.

In yet other applications, the needs can be associated with points of interest, such as those associated with vacations, restaurants, places of entertainment, and so on. Again, the needs can be processed individually and as blocks for more efficient processing and transactions.

The disclosed architecture also benefits vendors by providing means for more closely working with customers needs, buying habits, buying behaviors and many other bits of information that facilitate statistical analysis to the micro level. For example, the notion that the vendor can now know that a user wants cherries today, but perhaps no later than tomorrow, offers information heretofore unavailable, which benefits both the customer and the vendor.

Figure 15:
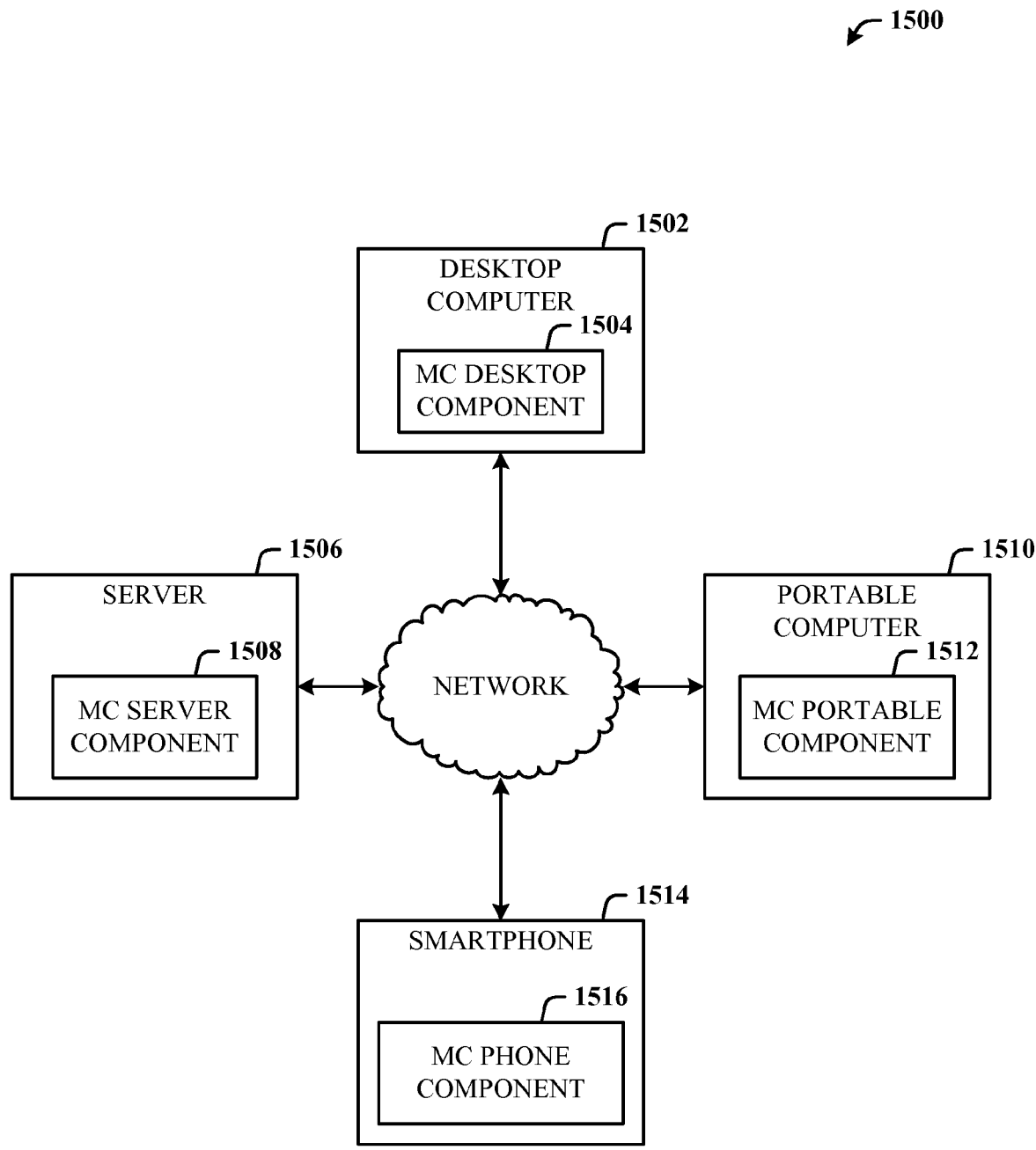
FIG. 15 illustrates one exemplary alternative implementation of methods and functionality for a mobile commodities (MC) system.

FIG. 15 illustrates one exemplary alternative implementation of a system 1500 that describes methods and functionality (referred to hereinafter as a mobile commodities (MC) system). The MC system 1500 performs an ongoing analysis about the cost of diverging from an efficient path to a destination so as to address background or evolving needs with goal-satisfying waypoints. The system 1500 considers a user's standing goals, the pricing and location of desired items, and the costs associated with the additional time and travel associated with modified trips.

The fundamental concept revisited is, given knowledge that a driver is heading toward a destination, consider a set of standing goals and preconditions specified by the driver, perform a search over all feasible options for satisfying the goals, and seek to identify and alert the mobile traveler about options for achieving the goal at minimal cost.

The MC system 1500 facilitates performing a search over the locations of relevant shops and services, and during this search, computes the time and distance required to divert the current trip through the locations and then back onto the path to the primary destination. Accordingly, the MC system 1500 minimizes the net cost of acquiring a product and/or accessing a service or experience, including consideration of the cost of time and fuel resources required to travel to the primary destination via the goal-satisfying waypoint. There are often chances to modify a current plan of action in a manner that allows more goals to be achieved. For example, people on their way to a destination might be able to easily take out some time during on their way to a goal location to take care of background needs or purchases.

The MC system 1500 includes intelligent logic that facilitates reasoning in an ongoing manner about the goals and needs of people, and by making people aware of opportunities to satisfy standing or recurrent goals when a primary task, such as driving to a particular location, occupies their focus of attention. The MC system 1500 can rely on having means for encoding goals and for reasoning about the best way to achieve such goals via an elegant overlaying of opportunities on the pre-existing plans of people.

The MC system 1500 includes several components that facilitate execution on desktop computers, servers, portable computers, and/or smartphones, for example, to names just a few. A desktop computer 1502 includes an MC desktop component 1504 that provides users with assessment tools that provide users with interfaces for specifying goals and preconditions, to define or to train up Bayesian models that provide the system with the cost of their time in different settings, and to define typical trips by time of day and day of week. The MC desktop component 1504 also allows the system to run scenarios for interested users, showing how the system reasons, allowing for modifications in the parameters it uses to analyze options for satisfying standing goal in an opportunistic manner.

The MC desktop component 1504 communicates with an MC server 1506 having an MC server component 1508. The MC server 1506 maintains a user profile, accessed via the desktop component 1504. The server 1506 also is in communication with other compatible devices: a portable computer 1510 having an MC portable component 1512 as client software, and a smartphone 1514 having an MC phone component 1516 as client software running on user's smartphone. The clients (1512 and 1516) allow the server 1506 to track the location of users reported by the portable computer 1510 and mobile devices 1514, and to communicate with users via an intermittent GPRS (general packet radio service) connection.

The MC server application component 1508 generates opportunistic plans for each user and sends the plans and sets of directions to user's portable computers 1510 and smartphones 1514. The MC phone component 1516 provides an interface to users for updates about opportunities and directions for carrying out the opportunistic plans. Additionally, the MC phone component 1516 intermittently communicates with the MC server 1506 via GPRS links. In one implementation, users use a standalone GPS (global position system) puck that automatically communicates with the smartphone 1514 via a Bluetooth protocol when the smartphone it is in close proximity.

Figure 16:
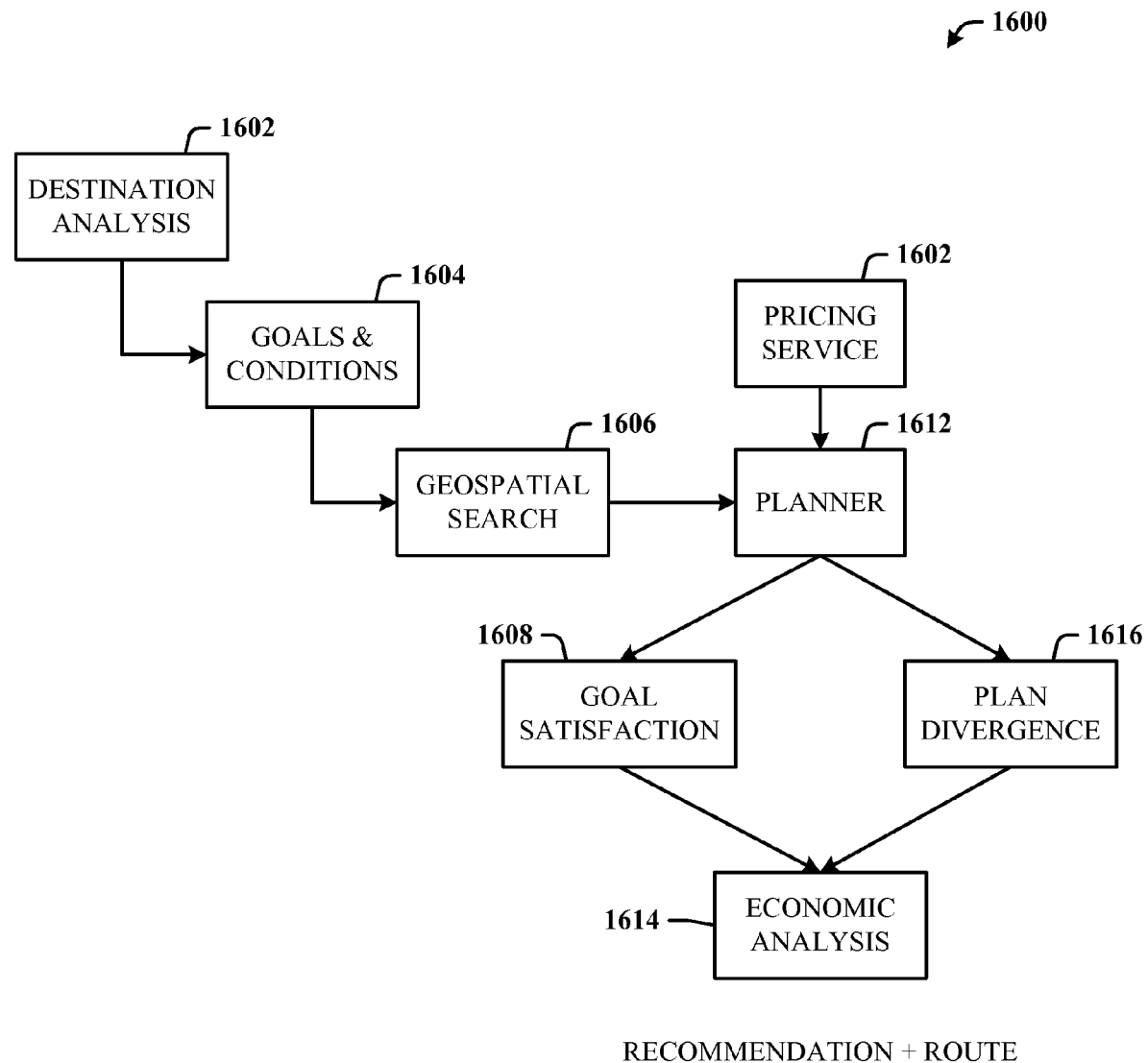
FIG. 16 illustrates components of an opportunistic planner system for mobile scenarios within the MC system.

FIG. 16 illustrates the main components of an opportunistic planner system 1600 for mobile scenarios within the MC system. A destination analysis component 1602 focuses on ascertaining the destination of a user in motion. Machinery for identifying a driver's destination range from, a subsystem that directly acquires a target location from a user, to a more sophisticated system that operates to infer a forthcoming destination from a case library of prior destinations.

The disclosed MC planner system 1600 allows three options for ascertaining destinations. Firstly, the system allows a user to specify a current destination by clicking on a scrollable map on the smartphone, for example. Secondly, the system also allows users to define default destinations by time of day and day of week. For example, users can describe daily commutes to and from a work location on weekdays by specifying the home and work locations and spans of time that travel should be assumed to be a commute. Thirdly, is an option to take a location on a user's calendar as the target destination. In another implementation, reasoning is provided that infers probability distributions over destinations.

A goals-and-conditions component 1604 centers on the representation of goals and the conditions when the goal is to become active. The system 1600 contains an ontology of products and services. Products include food items, gasoline, consumer electronics, and so on. Services include such items meals, haircuts, and oil changes. System users can also specify particular stores or service providers by brand name.

The ontology of goals is constructed over time, starting with common examples. For each goal, users area allowed to specify preconditions on a short, predefined form that specifies a policy about when that goal should become active. A number of the goals are in the class of items that require ongoing replenishment or satiation. For example for gasoline, users can specify a threshold on the remaining amount of gasoline in their automobile's fuel tank, below which the system should begin to identify opportunities to seek gasoline. The frame-based policy for the gasoline allows users to include size of their fuel tank, the average miles per gallon, and the fuel remaining. The system 1600 then tracks the fuel expenditure via observing the number of miles driven. For recurrent purchases such as food items or recurrent services such as haircuts, users provide a target duration between each purchase or receipt of service. For example, users can specify the desired period of time between adjacent haircuts and the date that the last haircut was received.

Figure 17:
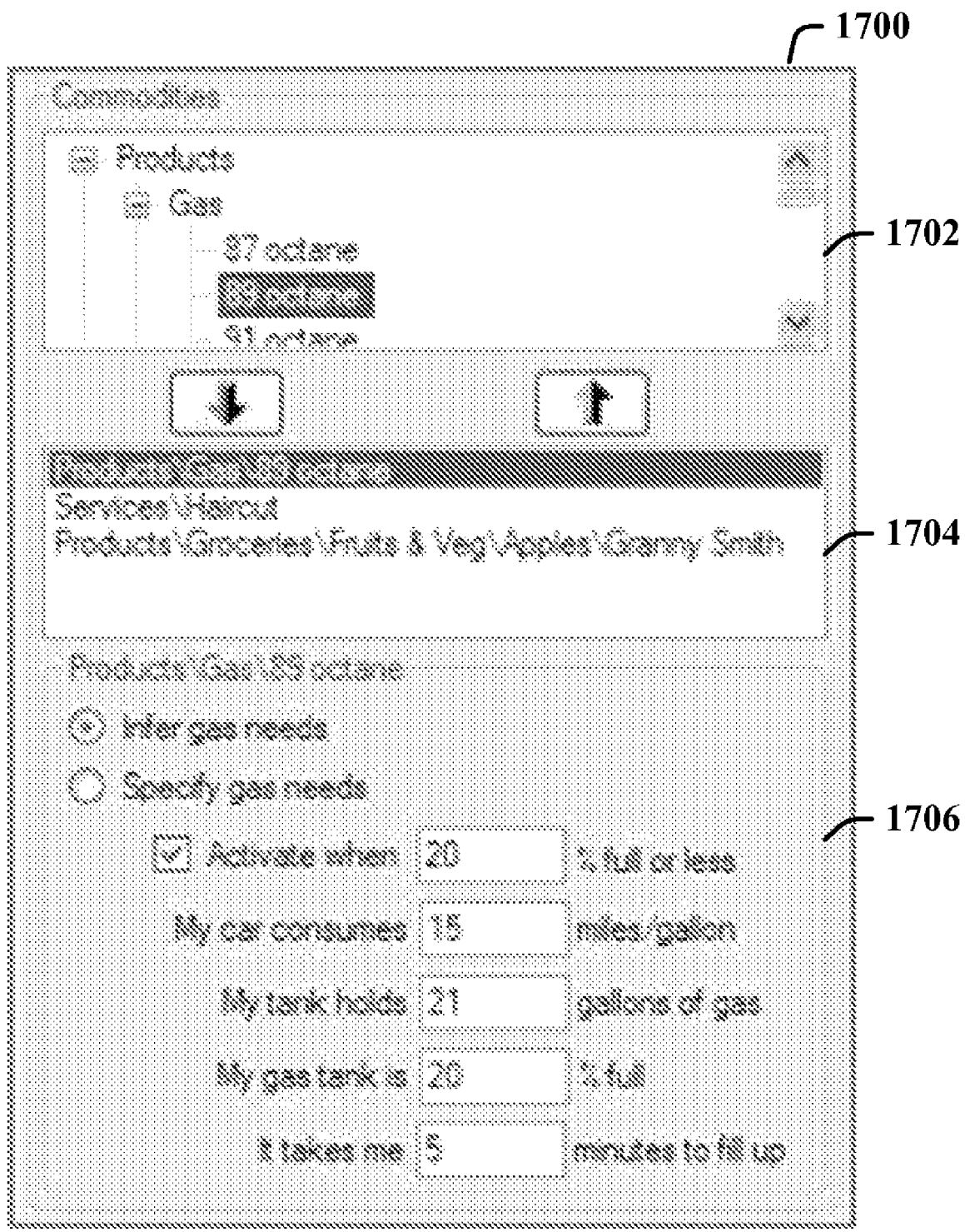
FIG. 17 illustrates shows a goals and conditions specification tool available on the MC desktop component.

FIG. 17 shows a goals and conditions specification tool 1700 available on the MC desktop component 1504. Here, the system shows a form that pops-up when gasoline is selected, allowing users to assert when fuel should be pursued. A conditions frame 1702 changes with each item type. A frame 1706 is for specifying gasoline preconditions and is displayed beneath the goal browser 1704.

A geospatial search component 1606 of FIG. 16 is a subsystem that identifies and scopes locations that can satisfy active goals. In one implementation, MapPoint by Microsoft Corporation can be employed for database services to identify locations of shops and services. This search component 1606 takes the user's current location and target destination, computes an efficient route to the destination, then identifies candidate locations that can satisfy the active goals, as stored and processed in a goal satisfaction component 1608. For tractability of an MC search, the number of locations can be limited for opportunistic purchases by a maximal tolerated distance of locations from points on the expected path that a user will take. As an example that highlights the operation of the MC architecture, the system has access to all of the gas stations in the Seattle area. Additional access is gained to a gasoline pricing service 1610. The real-time gasoline pricing service 1610 contains prices that are updated daily.

Figure 18:
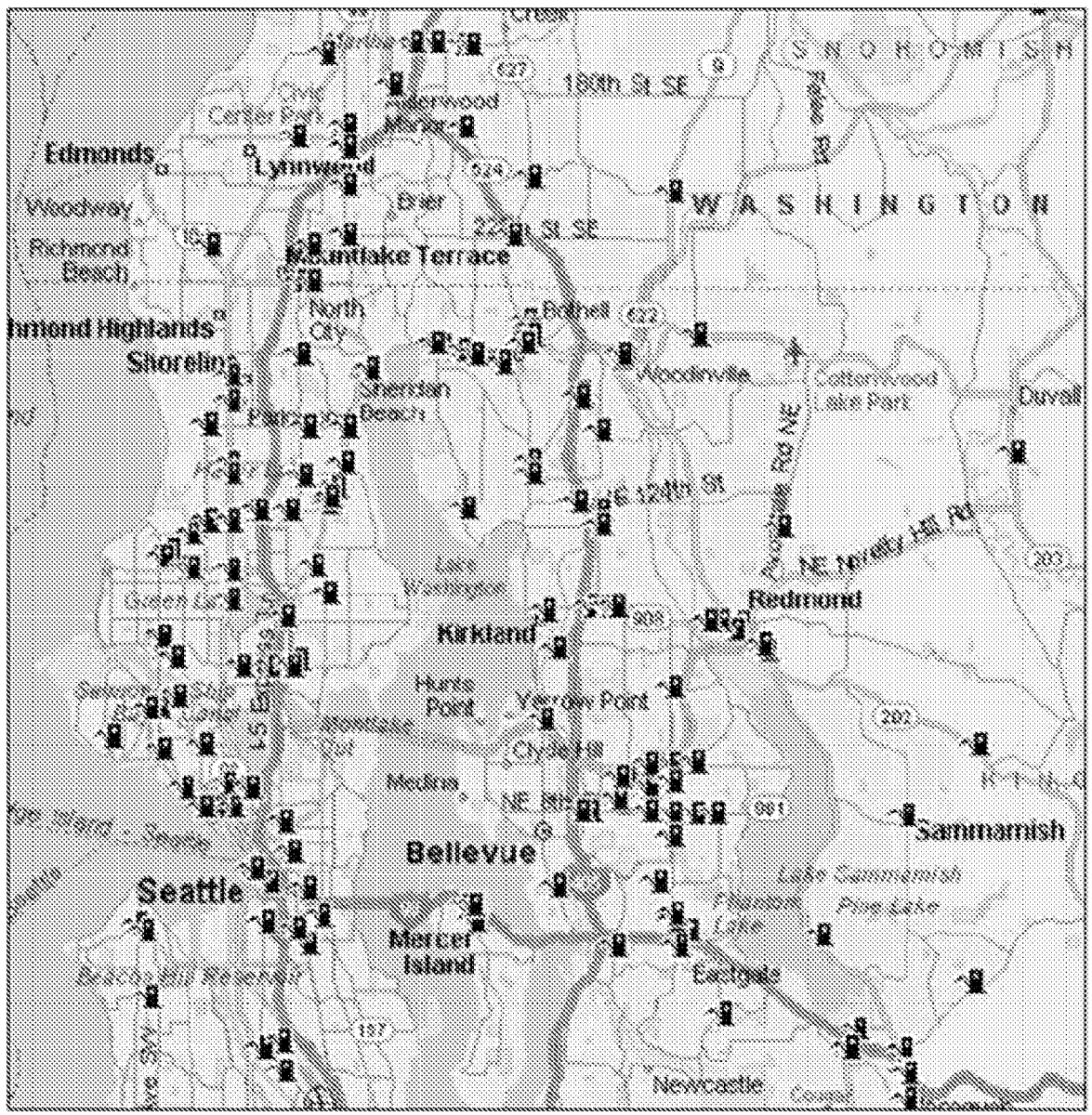
FIG. 18 illustrates an example of a representation of a goal-centric commodity by location, for example, the locations of gas stations in the Greater Seattle region.
Figure 19:
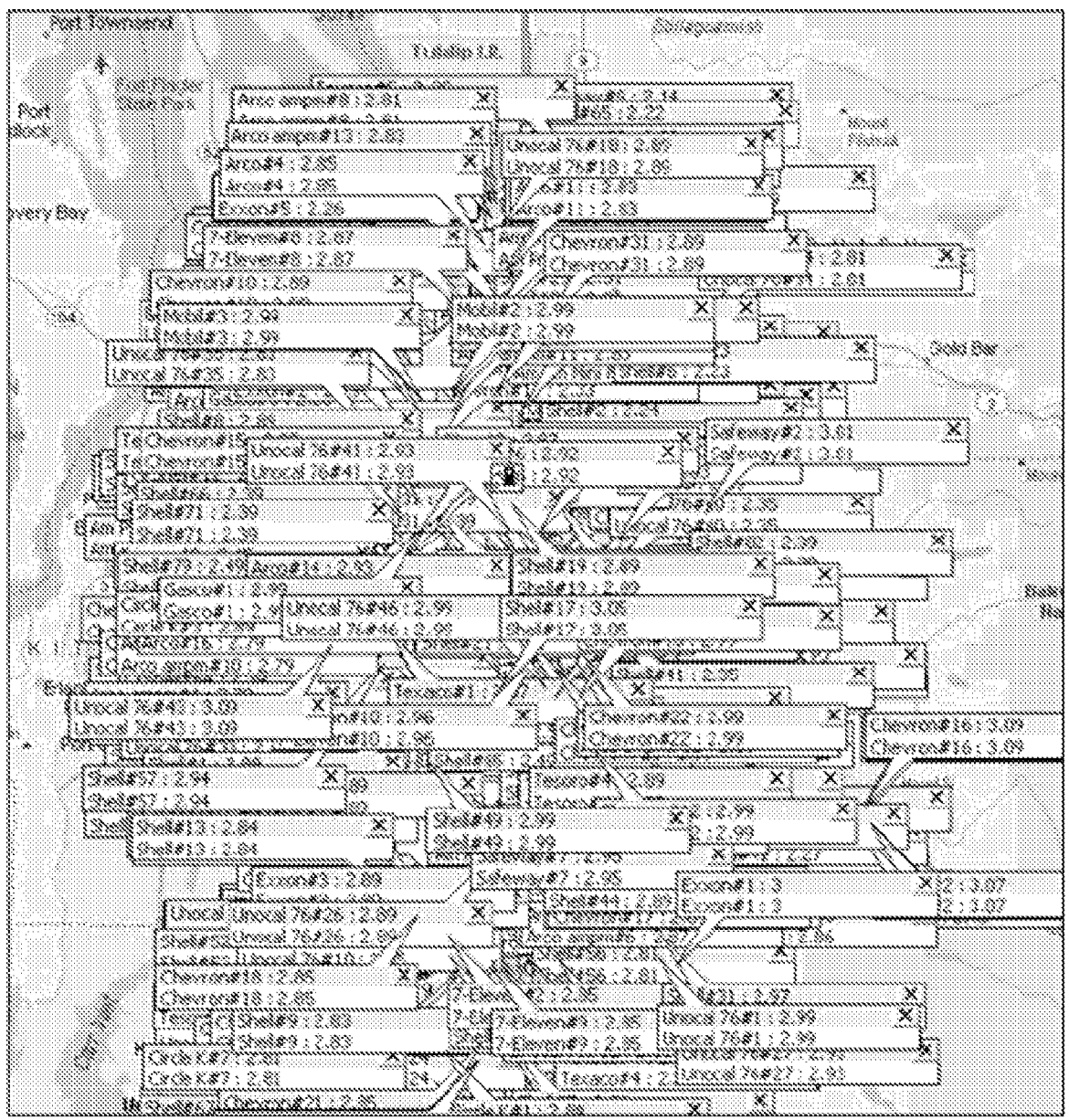
FIG. 19 illustrates an overlay of late-breaking gasoline prices for different qualities of fuel at corresponding locations.

FIG. 18 illustrates an example of a representation of a goal-centric commodity by location, for example, the locations of gas stations in the Greater Seattle region. FIG. 19 illustrates an overlay of late-breaking gasoline prices for different qualities of fuel at corresponding locations. A planner 1612 attempts to satisfy active goals and to minimize the cost of diverging from the efficient path to the primary inferred or specified destination. The planner 1612 also performs an economic analysis, seeking to minimize the expected cost of the satisfying active goals. The planner 1612 first examines the efficient path of the user to their current primary destination and also the active goals and the associated candidate locations, and performs an exhaustive search over alternate routes that include locations that satisfy goals as way points on the path to the destination. For each path, the planner 1612 caches the path, the goals satisfied, the available prices of the desired items or services available at the waypoints, a set of directions that routes the driver from the current location through the identified locations, and the total number of miles and time required for each route. Within the economic analysis subsystem 1614, the planner 1612 accesses a context-sensitive cost of time for the user, and seeks to minimize the total cost to the user of diverting off of the most efficient path to the primary destination (per a plan divergence component 1616), based on the additional cost of time and of transportation. The economic analysis 1614 of the cost and benefits of divergence lies at the heart of opportunistic mobile planning and commerce.

Figure 20:
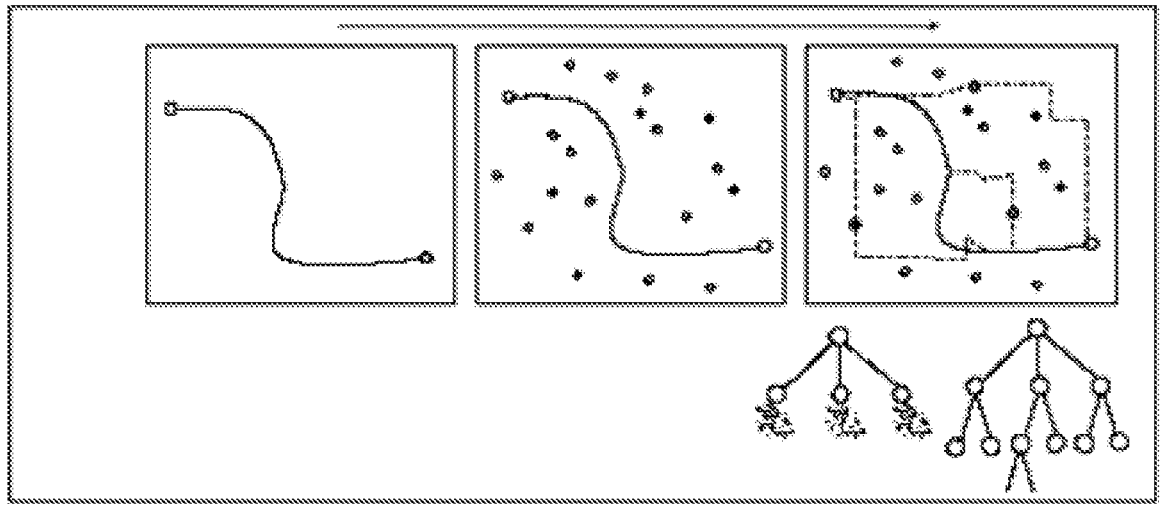
FIG. 20 illustrates a schematic portraying operation of the planner of FIG. 14 showing from left to right the identification of the most efficient driving route to a primary destination.

FIG. 20 illustrates a schematic portraying operation of the planner 1612 of FIG. 16 showing from left to right the identification of the most efficient driving route to a primary destination, the locations that can satisfy active goals, and a search over alternate routes that satisfy one or more goals on the way to the primary destination. The cost of divergence from the original trip for each alternate route is considered in generating minimum cost recommendations.

Figure 21:
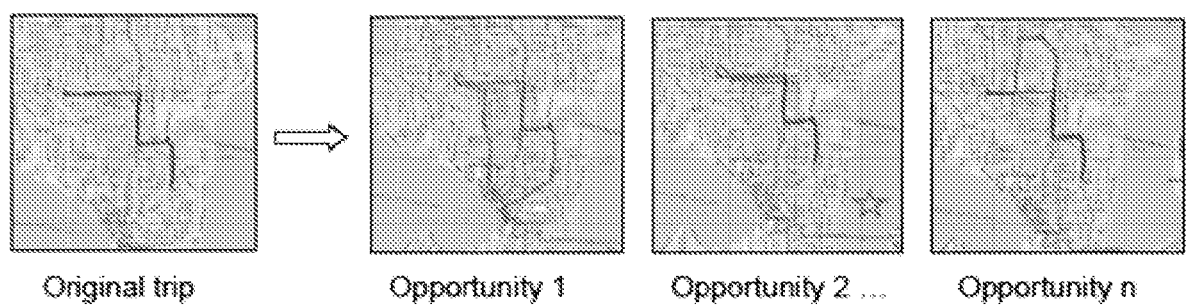
FIG. 21 illustrates an exemplary portion of planner's divergence analysis, showing initial efficient route and three alternate routes of a larger space of candidates that satisfy a goal.

FIG. 21 illustrates an exemplary portion of planner's 1612 divergence analysis, showing initial efficient route and three alternate routes of a larger space of candidates that satisfy a goal. In this case, Opportunity 2 was identified as the best alternative of the search through all relevant waypoints.

With respect to direct assessment of the cost of time, the MC architecture provides two means for users to assess a cost of time that is used by the planner 1612: an appointment-property-centric method, and a more powerful machine learning methodology. For both methods, users first assess a default, background cost of time. For this background cost of time, users provide direct assessments of the cost of time in terms of dollars per hour associated with increasing the durations of travel to destinations conditioned on the time of day and day of week. The MC system provides a seven-day by twenty-four hour time palette that allows users to mark in an efficient manner swaths of time as being associated with low, medium, or high cost of being tardy. Users assign values for dollars per hour as a cost of time for each of the three states of affairs.

Figures 22, 23:
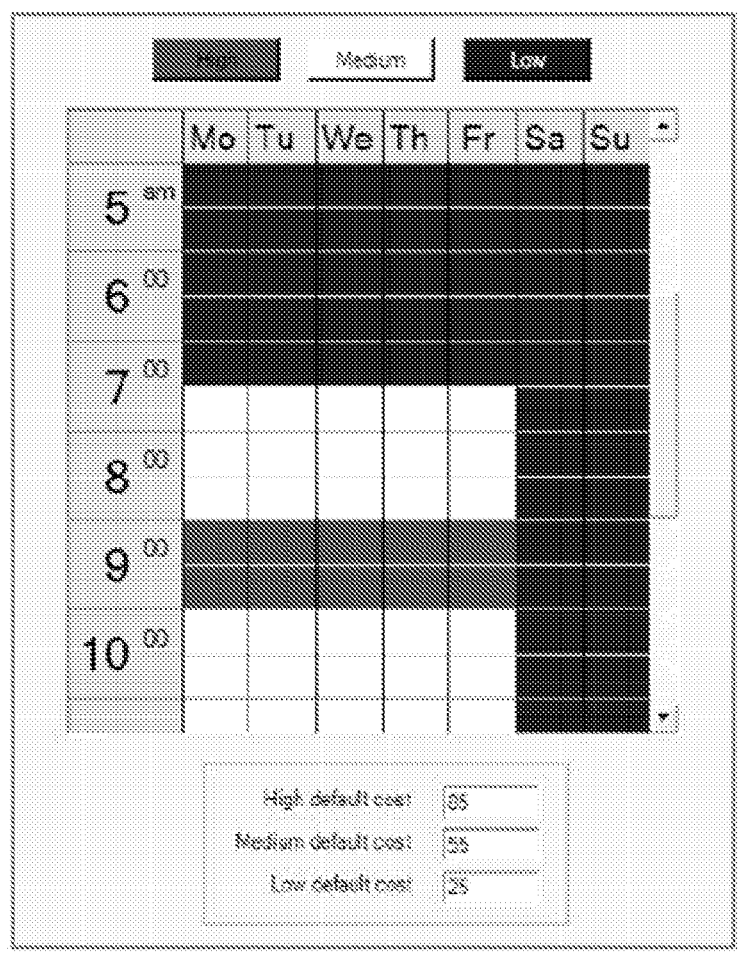
FIG. 22 illustrates a 24/7 cost-of-time assessment palette allowing users to sweep out regions background costs of time.
FIG. 23 illustrates a portion of an assessment form constructed from online appointments allowing users to build a case-library of appointments.

FIG. 22 illustrates a 24/7 cost-of-time assessment palette, allowing users to sweep out regions of low, medium, and high background costs of time, by time of day and day of week, and to associate a dollars per hour rate with each state.

Beyond default background times, the MC system accesses the user's online appointments and notes when a meeting is within a preset horizon. In one implementation, the online appointments can be accessed via Microsoft Exchange. Users can be asked to assign two costs for meeting situations, capturing the social and coordinative costs of being late for a meeting: users can be allowed to enter a tardy penalty, a dollar value representing what users would be willing to pay to avoid being late, and a lateness fee, the additional cost of time for each minute they are late after that. Beyond considering meeting versus no meeting situations, the MC system provides a facility for splitting out meetings by calendar properties, allowing users to assign different tardy penalties and lateness fees to different kinds of meetings. After assessment of default and meeting-centric time costs and penalties, the MC desktop component application uploads a database of costs by time to the MC server. The MC server component application uses these costs in doing cost analysis during opportunistic planning.

With respect to learning predictive models for the cost of time, such models can introduce richer sophistication to the reasoning of the system, allowing the system to automatically assign costs of being late for different events based on the structure of appointments on a users' online calendar. Following is briefly description of the learning of such models and the computation of the expected cost of being late, and how the learning methods can be integrated into the MC system.

In the machine learning effort, models can be built that infer (1) the probability that a meeting is associated with a low, medium, or high cost of being tardy, and (2) the probability that a meeting on a users calendar is a valid deadline, based on multiple factors, including whether or not the user wishes to attend the meeting in person. A calendar data extraction tool can be developed for use in predicting the costs associated with interrupted users during different types of meetings. The calendar tool builds a form containing a time-sorted list of appointments from a user's online calendar. The form can contain two sets of radio selection buttons, adjacent to each appointment item. The first two selections allow users to indicate whether it is valid to consider the starting point of the meeting at the focus of attention to be a valid deadline, and, if so, whether the meeting should be associated with a high, medium, or low cost of being late.

FIG. 23 illustrates a portion of an assessment form constructed from online appointments, allowing users to build a case-library of appointments tagged to reflect the costs of late arrival, and whether appointments represent active deadlines. The case library is used in learning predictive models of the cost of time.

Given an assessed database of tagged appointments, a training set can be prepared by writing out, for each appointment the target of the predictions—the tags from the users, and also a set of properties associated with each appointment. The properties can include the meeting date and time, meeting duration, strings from the subject and location fields, information about the organizer, the number and nature of the invitees, the response status of the user to an online invitation, whether the meeting is a recurrent meeting or not, and whether the time was marked as busy versus free on the user's calendar. Additionally, the role of the user, whether the user was the organizer of the meeting versus listed as a required or optional attendee by another organizer, can be included.

A directory service can be employed to recognize and annotate organizational relationships among the user, the organizer, and the other attendees. As an example, the system recognizes whether the organizer and attendees are peers, managers, or direct reports. Finally, it is noted whether the attendees, organizer, or location is "atypical" given the other meetings in the users data base; that is, it is identified whether they are present in less than a predefined small fraction of all of the meetings in the training set.

Given the library of cases, the desktop MC component application employs Bayesian structure learning to build Bayesian networks for predicting session outcomes. The system constructs models by performing heuristic search over feasible probabilistic dependency models, guided by a Bayesian score to rank the candidate models. Each model can be represented as a candidate Bayesian network of the set of random variables under consideration, and proposed structure of directed arcs between the nodes. The Bayesian structure search method can employ both global and local searches. For each variable, the method creates a tree containing a multinomial distribution at each leaf, exploiting the local structure search methods.

Figure 24:
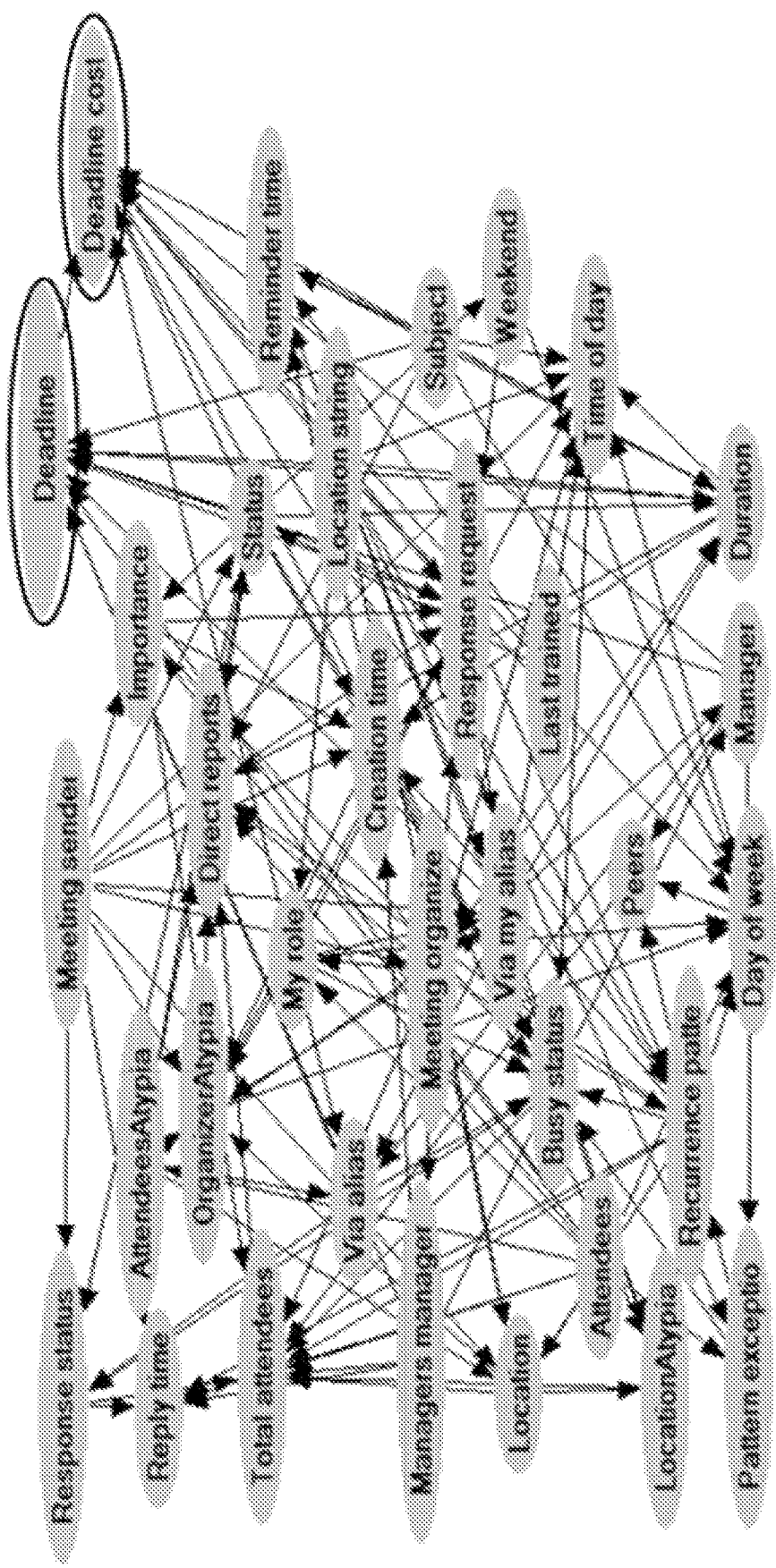
FIG. 24 illustrates a Bayesian network model learned from a case library of tagged appointments.

FIG. 24 illustrates a Bayesian network model learned from a case library of tagged appointments. The model predicts the likelihood that appointments start times are genuine deadlines for meetings and for predicting the cost function associated with tardiness. The individual is a member of an organization who relies on his or her online calendar for appointments. The individual tagged appointments over a 13-month period, a task which took the individual approximately forty-five minutes to complete. Eighty-five percent of the case library is employed for training the model, and the predictive accuracy of the models is tested on the remaining fifteen percent of holdout data. Target variables for the association of a deadline with the start of an appointment and the cost of being delayed are highlighted as circled nodes.

The following table shows one example of classification accuracy of a predictive model when tested on a holdout set. The accuracy of the respective marginal models are listed beneath the accuracies of the learned models. The table displays the accuracies of the inferences about the likelihood of deadlines being associated with calendar items and the probability distribution over the meeting being in the class of low, medium, or high cost of being tardy.

|  | Active deadline | Cost of Delayed Arrival |
| --- | --- | --- |
| Learned Model | 0.90 | 0.88 |
| Marginal Model | 0.52 | 0.44 |

With respect to integrating cost of time into opportunistic planning, adding waypoints in an opportunistic manner to a pre-existing trip adds time and fuel costs to an overall trip. Reasoning about the best options for addressing background goals hinges on computing the additional costs for each alternate plan. In the simple, non-probabilistic case, the additional time and miles incurred is considered with the divergence off the most efficient path for each opportunistic plan. This cost is referred to as the cost of divergence (CD) associated with each candidate plan. The MC system makes available two different divergence analyses depending on the selection of the user and the investment in direct assessment versus machine learning.

The first and simpler analysis is deterministic analysis of the cost of divergence. Denote use $S^b$ and $S^a$ to refer background, non-appointment situations and special appointment contexts respectively. For the default, background costs assessed above, $S^b$ refers to the time of day and day of week. Note that this default cost could be extended to depend on multiple aspects of a user's overall context S, beyond time of day and day of week. However, this would increase the complexity of assessment.

Use $\Delta d$ to refer to the additional miles associated with the plan, and $\Delta t$ to refer to the additional time of the trip due to the inclusion of one or more opportunistic waypoints to achieve standing goals, in addition to the estimate of the time required to execute the goal once at the appropriate location. The additional time $\Delta t$ is decomposed into the time until a meeting starts, $t^b$, and the time, $t^a$, after the start of the meeting that may be a relevant deadline.

In the deterministic cost of divergence computation, appointments on the user's calendar are associated with deadlines and are mapped deterministically to cost functions associated with the properties of the functions. For the case where the time for executing the modified travel plan leads to a missing of the start of a meeting, the cost is the sum of the background time cost incurred before the deadline, $C(S^b, t^b)$, the penalty for being tardy, $C^p(S^a, t^a>0)$, and the growing cost of lateness, capturing the increasing cost with arriving late for the appointment, $C(S^a, t^a)$. Consideration can also be made for the additional transportation costs (fuel and wear and tear on the vehicle), $C^f$, associated with the divergence from the efficient path to the primary destination. This transportation cost, $C^f(\Delta d)$ is a function of the change in miles, $\Delta d$, associated with each divergence. Thus, the cost of divergence is, $$CD = C^f(\Delta d) + C(S^b, t^b) + C(C_i^a t^a) + C^p(S_i^a, t^a)$$

where $S_i^a$ refers to the particular appointment which cost context (low, medium, and high) is active.

In a more sophisticated analysis of the cost of time, the MC system can make use of the inferences from the predictive model (described above) to generate the cost of diverging from the ideal route to the destination. From above, the following have been obtained: (1) the assessed background default cost of time in different situations, (2) inferences from the probabilistic model, based on the properties of forthcoming meetings, that provide the likelihood that the start times of the forthcoming meetings are relevant as deadlines users, and (3) inferences about the probability distribution over the cost of missing a deadline as a function of tardiness.

These quantities can be used to compute the expected cost of divergence (ECD) associated with any amount of time and/or distance added to the trip by considering the costs associated with the deadline relevant and not relevant situations, and combining the two situations together weighted by the likelihood of relevance and its complement.

The relationship $p(A|E)$ is the probability that a deadline for the appointment A is relevant conditioned on evidence E, a set of properties of a forthcoming appointment $S^a$. The probability that a deadline is not relevant is the complement, $1-p(A|E)$. For the case where the deadline is not relevant, the cost of time is just the background default cost based on the default context or situation, $C(S^a, \Delta t)$. For the case where the deadline is active, use the background time cost incurred before the deadline, $C(S^b, t^b)$, the penalty for being tardy, $C^p(S^a, t^a > 0)$, and the growing cost of lateness, capturing the increasing cost with arriving late for the appointment, $C(S^a, t^a)$. The MC system can be uncertain as to the cost functions associated with any appointment, so the system computes an expectation by summing over the probability distribution of time cost functions inferred by the predictive model.

Putting these terms together, weighting the influences of the appointment and non-appointment scenarios by the appropriate likelihoods, and adding the transportation cost, the ECD is computed for each alternate route as, $$ECD = C^f(\Delta d) + (1 - p(A|E))C(S^b, \Delta t) + p(A|E)\left(\sum_i p(S_i^a|E)(C(S_i^a, t^a) + C^p(S_i^a, t^a)) + C(S^b, t^b)\right)$$

where $p(S_i^a|E)$ is the probability that each appointment cost context (low, medium, and high) is active.

All of these quantities are available when a probabilistic model is made available to the system. The costs of divergence described in this section are used to identify the best opportunistic plans in the MC prototype. We now turn to summarizing the status of the operation of the prototype system for the end-to-end application implemented for opportunistic gas purchases.

The MC system can be extended to other commodities and resources, including non-retail opportunities, such as rest stops, parks, etc. With the gasoline application, as described supra, the MC server application is in contact with the smartphone MC phone component via GPRS, which is, in turn, in communication with a GPS puck via a Bluetooth connection that is established automatically when a user carrying a smartphone enters their car.

The smartphone intermittently relays to the MC server the user's location as well as the distances being traveled by the user. The MC phone component allows a user to send back a signal to the server when the user's gas tank is filled up. That information, coupled with an estimate of the amount of gas remaining in the car (based on an earlier specification by the user of the expected miles per gallon), is used to identify the server when to begin planning to assist the user to purchase fuel. The system begins to plan for gas purchases opportunistically when the user-specified precondition has been met, and the estimation of the amount of fuel remaining in the user's tank drops below a threshold.

When the MC system begins to work to satisfy the goal of identifying a best location to purchase gasoline, the system executes a cycle of analysis on the server every ten minutes, for example. In each cycle, the system identifies the driver's location and guesses the driver's destination. With regard to the destination of the driver, one implementation assumes that on weekdays, a drive from the home between a span of input AM hours is a trip to the primary work location of the user, and that a drive from the office during a span of PM hours is a trip to home. During the day, the system can be instructed to assume that the location coded in appointments is the destination of the user.

However, this assumption can be a poor one. Users can also bring up a map of the Seattle area and simply scroll the map and click on the current destination. This can be unsatisfactory in a system that is intended to work in the background. Accordingly, the destination inference in the system can be extended to make intelligent inferences about the user's destination.

When planning is active, the MC server component accesses the user's assessments of the cost of time for the default period of time and for appointments. The system also accesses a database of the user's forthcoming appointments and examines the appointment properties. It then computes the cost of time using either of the equations for CD or ECD, depending on whether the user has invoked the richer analysis, having earlier tagged a list of appointments, as described supra.

For each cycle of opportunistic planning, the MC server component (or application) first computes an ideal path from the user's current location to the assumed destination, using a route-planning application. The application then identifies all gas stations within the greater Seattle region and loads their current gas prices. The system exhaustively searches through new trips composed as trips of maximal efficiency starting at the current location to the destination, and going through each candidate filling station as a new waypoint.

Heuristics can be utilized to limit searching as the service is scaled for use by larger numbers of people. Such heuristics include limiting the candidate waypoints to a maximal specified distance from points on the efficient path to the primary destination. For each potential plan, the total miles and estimates of the time required for the modified trip are computed. For each candidate route and waypoint, a divergence in miles and time for the new route, by taking the difference in miles and in time associated with the new trip and the original trip, as well as the cost assumed for the time required to stop and fill up. An overall dollar value cost of divergence is computed for each candidate trip. This cost is added to the cost of the intended purchase, computed as the price of the gas and the number of gallons required to fill the driver's tank.

The MC system then prioritizes the alternate routes from low net cost to higher costs and sends the top five candidates to the MC phone component (or application), along with summary information about each candidate, and the turn-by-turn directions for each. A user can accept an option, turning off the gasoline analysis for the current drive. The directions divert the user off of the current path through the waypoint and then back to the final destination. Drivers can set up an alerting policy to limit notifications about opportunities on a smartphone from once to a few times per trip. The policies also allow the specification of the minimum amount of time between any two alerts.

Figure 25:
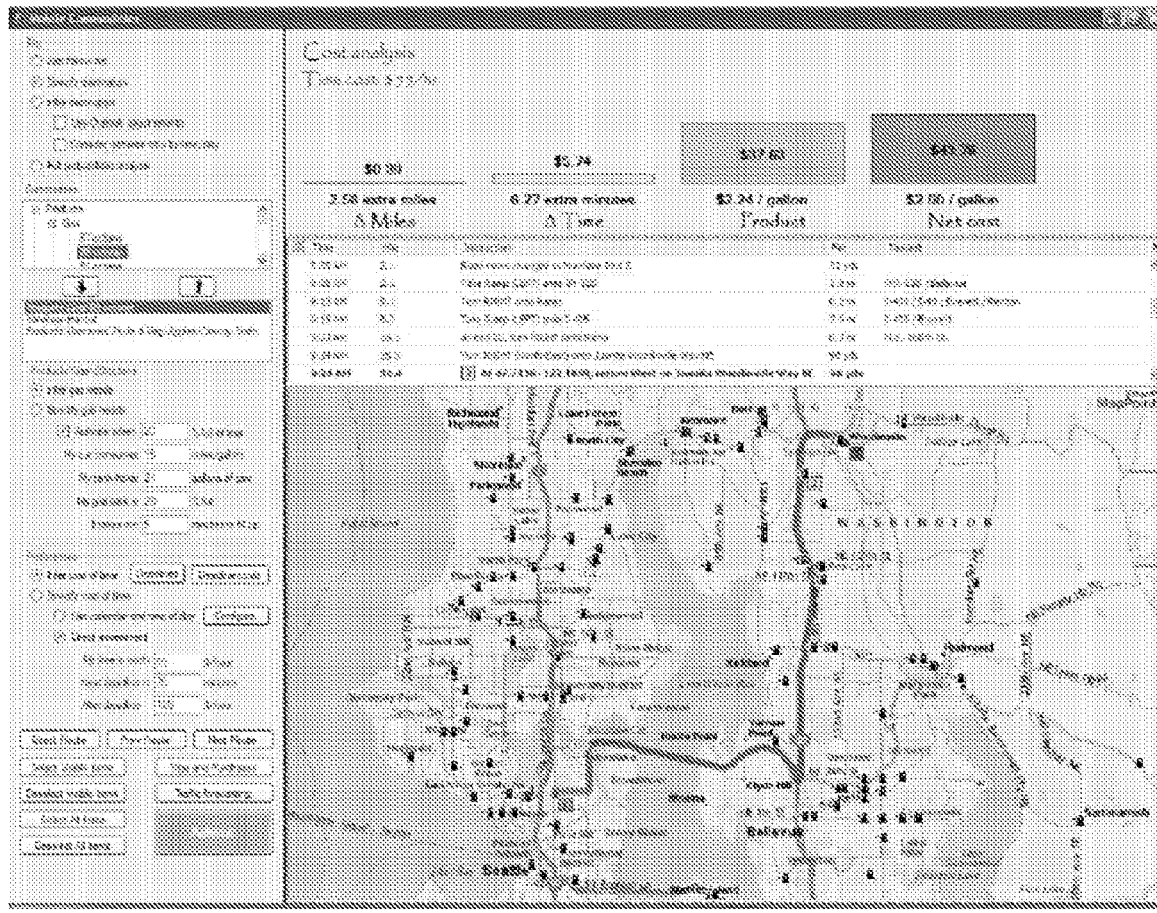
FIG. 25 illustrates a screenshot of a console view of an exemplary MC desktop application and the reasoning of the system.
Figure 26:
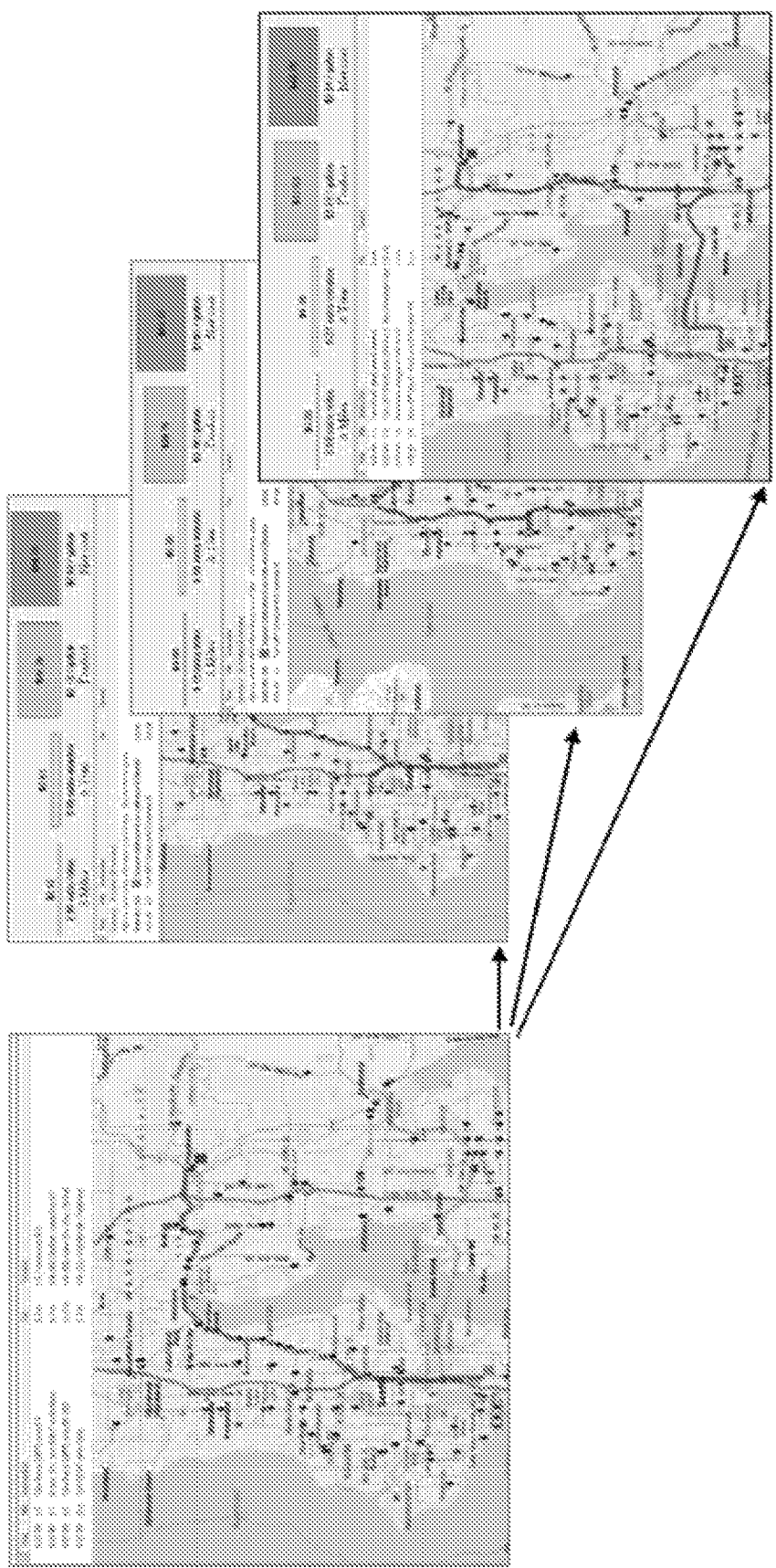
FIG. 26 illustrates a portion of the MC system deliberation about the best place to stop for fuel by showing the original efficient route and several opportunistic routes for purchasing gas that it has explored.

FIGS. 25 and 26 illustrates how the MC planning system can reveal its reasoning. FIG. 25 shows a screenshot of a console view of an exemplary MC desktop application and the reasoning of the system. The search is being run in an analytic mode, showing the results of a search over alternate routes through different waypoints for the goal of purchasing gasoline opportunistically. The economic analysis of the total cost of diverging from the best route to the primary destination is displayed in a bar graph at the top of the screen. The system shows a candidate opportunistic plan. A summary of the divergence analysis and net cost is displayed at the top of the screen.

FIG. 26 illustrates a portion of the MC system deliberation about the best place to stop for fuel by showing the original efficient route and several opportunistic routes for purchasing gas that it has explored. Three alternate routes satisfy a goal of obtaining gasoline are displayed. The alternate route displayed for each opportunistic plan includes driving directions, and a summary economic analysis of the goal satisfaction and the divergence represented in each opportunistic plan, based on the additional distance, fuel, and the cost of time for this user in the current context.

Once filling up, a user can tell the MC server that the tank has been filled. However, alternatively, the MC system can make take the observation that a driver has paused at a recommended filling station for more than a threshold period of time (e.g., seven minutes), as confirmation that the user has filled up the tank at the station. A signal that the user has filled their tank turns off the precondition for opportunistic search for gasoline. The MC system then reverts back to simply monitoring the total traveled miles, and updating its estimation of the remaining quantity of fuel.

The MC planning system allows engineers to step through of the results of its searches. The system displays the original route, as well as candidate routes and locations for purchasing gas ordered from lowest cost to highest cost candidates.

Figure 27:
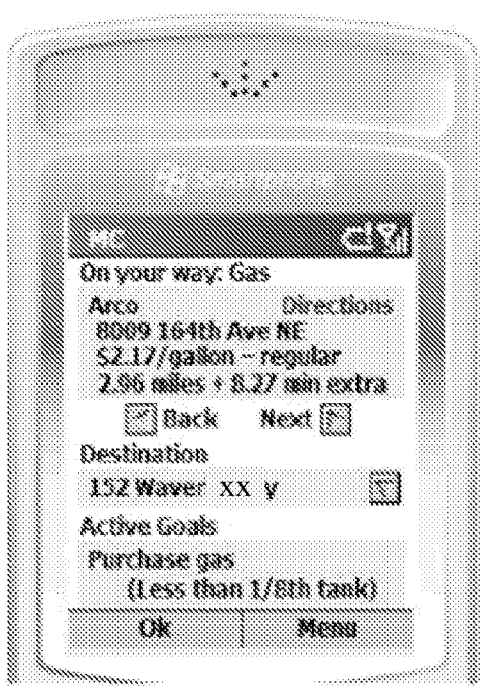
FIG. 27 illustrates a notification display generated by the MC phone application of a smartphone, and a view of directions for the modified route.

FIG. 27 shows a notification display generated by the MC phone application of a smartphone, and a view of directions for the modified route. It is a smartphone view of an alert about a best candidate for opportunistic fueling. An assumed primary destination is displayed, in this case during a commute home from work in the evening.

Figure 28:
FIG. 28 illustrates the MC phone component of the smartphone displaying the directions to the best fueling location, based on a minimization of cost, and on to the primary destination.

FIG. 28 illustrates the MC phone component of the smartphone displaying the directions to the best fueling location, based on a minimization of cost, and on to the primary destination.

As a general summary, the MC system focuses on identifying challenges and opportunities for building an opportunistic planning system that works continuously to address short- and longterm goals encoded by people and that computes how such goals might be addressed in-stream with ongoing travel and work. The MC system can operate with additional extensions: (1) the bundling of opportunities and the simultaneous search over multiple goals, potentially using modern planning techniques to address the combinatorial explosion; (2) the integration of a destination prediction service and the generalization of the methods by considering probability distributions over driver's destinations, (3) the moving to a full cost-benefit analysis of opportunities, including the development of the ability to learn over time to recognize special offers and anomalously low prices, and (4) the development of a time-critical pricing system that allows retailers to post special time limited prices to mobile people, and to communicate directly with peoples' opportunistic planners.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 29:
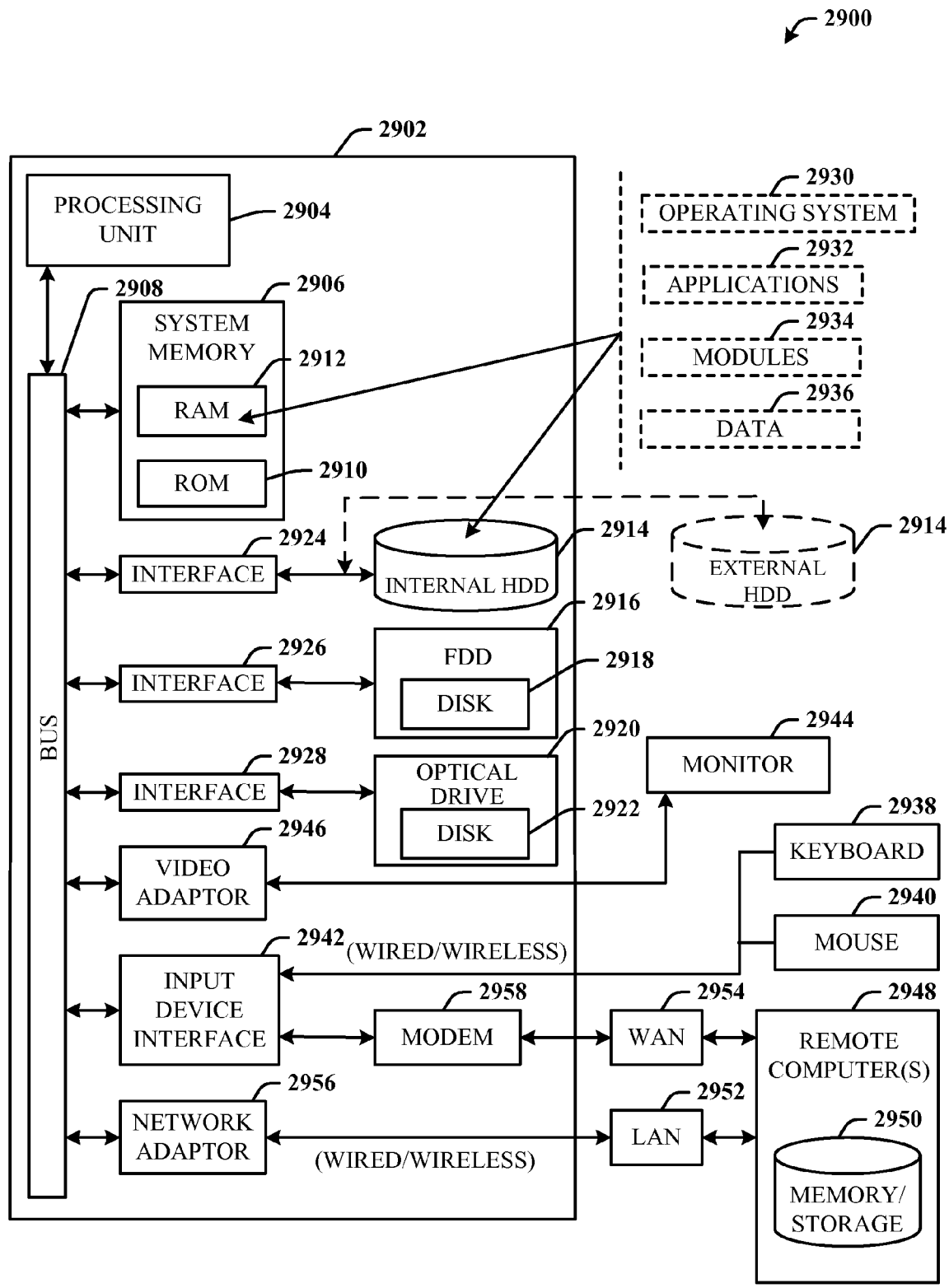
FIG. 29 illustrates a block diagram of a computer operable to execute the context sensitive reminder and service facilitator architecture.

Referring now to FIG. 29, there is illustrated a block diagram of a computer operable to execute the disclosed context sensitive reminder and service facilitator architecture. In order to provide additional context for various aspects thereof, FIG. 29 and the following discussion are intended to provide a brief, general description of a suitable computing environment 2900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 29, the exemplary environment 2900 for implementing various aspects includes a computer 2902, the computer 2902 including a processing unit 2904, a system memory 2906 and a system bus 2908. The system bus 2908 couples system components including, but not limited to, the system memory 2906 to the processing unit 2904. The processing unit 2904 can be any of various commercially available processors. Dual microprocessors and other multi-processor architectures may also be employed as the processing unit 2904.

The system bus 2908 can be any of several types of bus structure that may further interconnect to a memory bus (with or without a memory controller), a peripheral bus, and a local bus using any of a variety of commercially available bus architectures. The system memory 2906 includes read-only memory (ROM) 2910 and random access memory (RAM) 2912. A basic input/output system (BIOS) is stored in a non-volatile memory 2910 such as ROM, EPROM, EEPROM, which BIOS contains the basic routines that help to transfer information between elements within the computer 2902, such as during start-up. The RAM 2912 can also include a high-speed RAM such as static RAM for caching data.

The computer 2902 further includes an internal hard disk drive (HDD) 2914 (e.g., EIDE, SATA), which internal hard disk drive 2914 may also be configured for external use in a suitable chassis (not shown), a magnetic floppy disk drive (FDD) 2916, (e.g., to read from or write to a removable diskette 2918) and an optical disk drive 2920, (e.g., reading a CD-ROM disk 2922 or, to read from or write to other high capacity optical media such as the DVD). The hard disk drive 2914, magnetic disk drive 2916 and optical disk drive 2920 can be connected to the system bus 2908 by a hard disk drive interface 2924, a magnetic disk drive interface 2926 and an optical drive interface 2928, respectively. The interface 2924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2912, including an operating system 2930, one or more application programs 2932, other program modules 2934 and program data 2936. All or portions of the operating system, applications, modules, and/or data can also be cached in the RAM 2912. It is to be appreciated that the innovation can be implemented with various commercially available operating systems or combinations of operating systems.

A user can enter commands and information into the computer 2902 through one or more wired/wireless input devices, e.g., a keyboard 2938 and a pointing device, such as a mouse 2940. Other input devices (not shown) may include a microphone, an IR remote control, a joystick, a game pad, a stylus pen, touch screen, or the like. These and other input devices are often connected to the processing unit 2904 through an input device interface 2942 that is coupled to the system bus 2908, but can be connected by other interfaces, such as a parallel port, an IEEE 1394 serial port, a game port, a USB port, an IR interface, etc.

A monitor 2944 or other type of display device is also connected to the system bus 2908 via an interface, such as a video adapter 2946. In addition to the monitor 2944, a computer typically includes other peripheral output devices (not shown), such as speakers, printers, etc.

The computer 2902 may operate in a networked environment using logical connections via wired and/or wireless communications to one or more remote computers, such as a remote computer(s) 2948. The remote computer(s) 2948 can be a workstation, a server computer, a router, a personal computer, portable computer, microprocessor-based entertainment appliance, a peer device or other common network node, and typically includes many or all of the elements described relative to the computer 2902, although, for purposes of brevity, only a memory/storage device 2950 is illustrated. The logical connections depicted include wired/wireless connectivity to a local area network (LAN) 2952 and/or larger networks, e.g., a wide area network (WAN) 2954. Such LAN and WAN networking environments are commonplace in offices and companies, and facilitate enterprise-wide computer networks, such as intranets, all of which may connect to a global communications network, e.g., the Internet.

When used in a LAN networking environment, the computer 2902 is connected to the local network 2952 through a wired and/or wireless communication network interface or adapter 2956. The adaptor 2956 may facilitate wired or wireless communication to the LAN 2952, which may also include a wireless access point disposed thereon for communicating with the wireless adaptor 2956.

When used in a WAN networking environment, the computer 2902 can include a modem 2958, or is connected to a communications server on the WAN 2954, or has other means for establishing communications over the WAN 2954, such as by way of the Internet. The modem 2958, which can be internal or external and a wired or wireless device, is connected to the system bus 2908 via the serial port interface 2942. In a networked environment, program modules depicted relative to the computer 2902, or portions thereof, can be stored in the remote memory/storage device 2950. It will be appreciated that the network connections shown are exemplary and other means of establishing a communications link between the computers can be used.

The computer 2902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 30:
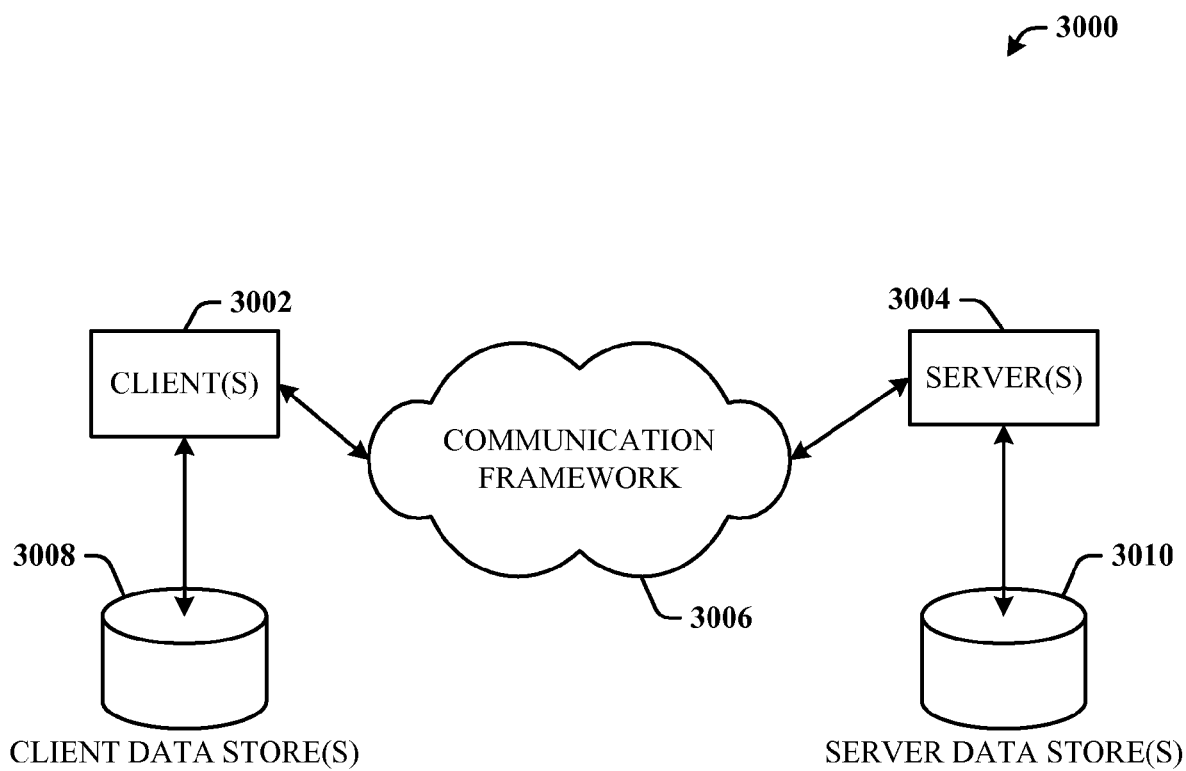
FIG. 30 illustrates a schematic block diagram of an exemplary computing environment operable to support the context sensitive reminder and service facilitator architecture.

Referring now to FIG. 30, there is illustrated a schematic block diagram of an exemplary computing environment 3000 operable to support the context sensitive reminder and service facilitator architecture, in accordance with another aspect. The system 3000 includes one or more client(s) 3002. The client(s) 3002 can be hardware and/or software (e.g., threads, processes, computing devices). The client(s) 3002 can house cookie(s) and/or associated contextual information by employing the subject innovation, for example.

The system 3000 also includes one or more server(s) 3004. The server(s) 3004 can also be hardware and/or software (e.g., threads, processes, computing devices). The servers 3004 can house threads to perform transformations by employing the innovation, for example. One possible communication between a client 3002 and a server 3004 can be in the form of a data packet adapted to be transmitted between two or more computer processes. The data packet may include a cookie and/or associated contextual information, for example. The system 3000 includes a communication framework 3006 (e.g., a global communication network such as the Internet) that can be employed to facilitate communications between the client(s) 3002 and the server(s) 3004.

Communications can be facilitated via a wired (including optical fiber) and/or wireless technology. The client(s) 3002 are operatively connected to one or more client data store(s) 3008 that can be employed to store information local to the client(s) 3002 (e.g., cookie(s) and/or associated contextual information). Similarly, the server(s) 3004 are operatively connected to one or more server data store(s) 3010 that can be employed to store information local to the servers 3004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for providing an opportunistic reminder, comprising:
   a context component that determines a context of an entity; and
   a processor executing an indication component that employs a probabilistic model to provide a reminder of a fact to the entity based at least in part upon the context and an expected value of providing the reminder, wherein:
   the indication component selectively outputs the reminder based upon a cost-benefit evaluation of whether to provide the reminder, and
   the expected value of providing the reminder is based at least in part on a value of the entity being informed of the fact within the context, a likelihood that the entity will recall the fact within a time frame and a cost of interruption to inform the entity of the fact.

2. The system of claim 1, the indication component further comprising a relevance component that reasons about a likelihood of a fact k being relevant to the entity by evaluating a probability that the fact k is relevant given the context, p(relevant(k)|context).

3. The system of claim 1, the indication component further comprising a knowledge component that evaluates whether the entity at least one of knows a fact k and will recall the fact k within a time frame, the knowledge component computes a probability that the entity knows the fact k given the context, p(knows(k)|context).

4. The system of claim 1, the indication component further comprising a valuation component that analyzes the value of the entity being informed of the fact within the context, the value comprising a value of the entity knowing of the fact.

5. The system of claim 4, the valuation component evaluates a value of being informed about the fact, k, by analyzing a difference between a value of knowing versus not knowing k within the context, the valuation component computes Utility(know(k)|context)−Utility(not know(k)|context).

6. The system of claim 1, the indication component further comprising an integrative component that analyzes an expected value of reminding the entity of the fact, k.

7. The system of claim 6, the integrative component evaluates a probability that the entity does not know the fact k, given a probabilistic combination of a probability that the fact k is relevant in the context and a probability that the entity would know the fact k, given that the fact k is relevant, p(not know(k)|context)=1−(know(k)|relevant(k), context)*p(relevant(k)|context).

8. The system of claim 6, the integrative component computes the expected value of informing the entity about the fact k in the context under uncertainty, whether the entity knows the fact k or not ahead of time, by evaluating eu(inform(k)|context)p(not know(k)|context)*[utility(know(k))−utility (not know(k)|context)]−cost(interruption(inform(k))|context), where eu is the expected value.

9. The system of claim 1, the indication component employs user specified high-level preferences and goals that define classes of knowledge as being at least one of relevant and having a likelihood above a threshold of being relevant.

10. The system of claim 1, the indication component generates opportunistic reminders related to user knowledge of at least one of the fact comprising a task desired, a need, a user's lack of an amount of an item, and a potential opportunity.

11. The system of claim 1, wherein:
   the entity is a person;
   the indication component evaluates a suspended task indicated and performed by the person; and the reminder reminds the person that the task is suspended to enable recovery from interruption associated with the suspended task.

12. The system of claim 1, the context being at least one of a location, information associated with a suspended task, a need, a status of expendable resources, and proximal businesses, services, terrain, and recreational facilities.

13. A computer-implemented method of selectively providing opportunistic reminders, comprising:
evaluating a context of a user;
analyzing whether to output a reminder of information to the user based upon a cost-benefit evaluation of providing the reminder and upon considerations of an expected value of providing the reminder and cost of informing the user in view of the context; and
selectively outputting the reminder based upon the analysis,
wherein the expected value of providing the reminder is based at least in part on a value of the user being informed of the information within the context, a likelihood that the user will recall the information within a time frame and a cost of interruption to provide the user the reminder.

14. The method of claim 13, evaluating the context further comprises analyzing at least one of a location of the user, a preference of the user, a calendar of the user, a need of the user, a time, a day, a month, a forthcoming meeting, a status of expendable resources, and proximal businesses, services, terrain, and recreational facilities.

15. The method of claim 13, further comprising inferring a likelihood of a fact being relevant to the user.

16. The method of claim 13, wherein the information comprises a fact, the method further comprising inferring a likelihood that the user knows about the fact and will recall the fact within the time frame.

17. The method of claim 13, wherein the information comprises a fact and the value of the user being informed of the information comprises a value of the user knowing the fact, the method further comprising evaluating a value of the user knowing by way of being reminded about the fact.

18. The method of claim 13, farther comprising selectively outputting the reminder based upon explicit and learned goals and preferences of the user.

19. The method of claim 13, further comprising selectively outputting the reminder by maximizing an expected utility associated with the user.

20. A computer-executable system for generating reminders, the system comprising:
means for determining a context of a user;
means for inferring, by the at least one processor, a first likelihood of a fact being relevant to the user in view of the context;
means for determining, by the at least one processor, a second likelihood that the user at least one of knows the fact and will recall the fact within a time frame given the context;
means for analyzing, by the at least one processor, a utility of the user knowing the fact given the context;
means for evaluating, by the at least one processor, cost of informing the user in view of the context; and
means for selectively outputting the reminder based upon a cost-benefit evaluation of whether to provide the reminder based on the utility of providing the reminder, the second likelihood and the cost of providing the reminder.

21. A computer-implemented system for providing an opportunistic reminder, comprising:
a context component that determines a context of an entity; and
a processor executing an indication component that employs a probabilistic model to selectively provide a reminder to the entity based at least in part upon the context, the indication component further comprising a valuation component that analyzes a value of the entity at least one of knowing and being reminded of a fact, the valuation component evaluates a value of being informed about the fact k by analyzing a difference between a value of knowing versus not knowing k within the context, the valuation component computes Utility (know(k)|context)−Utility(not know(k)|context).

22. A computer-implemented system for providing an opportunistic reminder, comprising:
a context component that determines a context of an entity; and
a processor executing an indication component that selectively provides a reminder to the entity based at least in part upon the context, the indication component further comprising:
a valuation component computes a first value based on the entity knowing the fact within the context;
the valuation component computes a second value based on the entity not knowing the fact within the context; and
the valuation component computes a third value based on cost of interruption to the entity;
the valuation component determining a resulting value associated with a utility of reminding the entity of the fact based at least in part on the first value, the second value and the third value.

23. The computer-implemented system of claim 22, wherein the valuation component determines the resulting value associated with a utility of reminding the entity of the fact by analyzing a difference between the first value and the second value.

* * * * *